US006736176B2

(12) United States Patent
Teratani

(10) Patent No.: US 6,736,176 B2
(45) Date of Patent: May 18, 2004

(54) TIRES

(75) Inventor: Hiroyuki Teratani, Iruma (JP)

(73) Assignee: Bridgestone Corporation, Tokyo (JP)

( * ) Notice: Subject to any disclaimer, the term of this patent is extended or adjusted under 35 U.S.C. 154(b) by 56 days.

(21) Appl. No.: 09/773,566

(22) Filed: May 14, 2001

(65) Prior Publication Data

US 2001/0042580 A1 Nov. 22, 2001

(30) Foreign Application Priority Data

| Jan. 29, 2000 | (JP) | 2001-019621 |
| Feb. 4, 2000 | (JP) | 2000-028064 |
| Feb. 4, 2000 | (JP) | 2000-028209 |
| Feb. 18, 2000 | (JP) | 2000-040820 |
| Apr. 12, 2000 | (JP) | 2000-110511 |
| May 31, 2000 | (JP) | 2000-162227 |
| Jul. 4, 2000 | (JP) | 2000-202469 |
| Jul. 27, 2000 | (JP) | 2000-227199 |
| Aug. 30, 2000 | (JP) | 2000-260164 |
| Aug. 30, 2000 | (JP) | 2000-261292 |
| Aug. 30, 2000 | (JP) | 2000-261293 |
| Jan. 29, 2001 | (JP) | 2001-019484 |
| Jan. 29, 2001 | (JP) | 2001-019800 |

(51) Int. Cl.$^7$ .................. B60C 17/00; B60C 17/04
(52) U.S. Cl. .................. 152/516; 152/520; 152/157; 152/310
(58) Field of Search .................. 152/516, 517, 152/518, 519, 520, 157, 310, 311

(56) References Cited

U.S. PATENT DOCUMENTS 3,915,774 A  * 10/1975  Dobson ................ 152/157
4,058,152 A  * 11/1977  Beck et al. ............ 152/310
4,751,951 A  *  6/1988  Dobson ................ 152/158
4,810,570 A  *  3/1989  Rutten et al. .......... 428/318.6
5,527,573 A  *  6/1996  Park et al. ............ 428/314.4
5,938,869 A  *  8/1999  Kaido et al. .......... 152/510
6,087,408 A  *  7/2000  Ide et al. .............. 521/79
6,170,545 B1 *  1/2001  Kobayashi et al. ..... 152/157
6,325,956 B2 * 12/2001  Chaudhary et al. ..... 264/50

FOREIGN PATENT DOCUMENTS

| GB | 2008505 | * | 6/1979 |
| GB | 2238513 | * | 6/1991 |
| JP | 48-47002 |   | 4/1973 |
| JP | 6-127207 |   | 5/1994 |
| JP | 6-183226 |   | 7/1994 |
| JP | 7-186610 |   | 7/1995 |
| JP | 8268007 |   | 10/1996 |
| JP | 8-332805 |   | 12/1996 |

* cited by examiner

Primary Examiner—Michael W. Ball
Assistant Examiner—Justin Fischer
(74) Attorney, Agent, or Firm—Sughrue Mion, PLLC

(57) ABSTRACT

A tire capable of stably running even if the tire is subjected to external injury without sacrificing rolling resistance and ride comfort in the usual running before being subjected to external injury, is provided. A composite body consists of a continuous phase of a resin and closed cells arranged in an inside of a hollow doughnut-shaped tire and the composite body has a cell content of 80.00 vol % to 98.75 vol %, and an internal pressure at 25° C. in the closed cell included therein is not less than 150 kPa as an absolute pressure.

2 Claims, 3 Drawing Sheets

TIRES

BACKGROUND OF THE INVENTION

1. Field of the Invention

This invention relates to a tire capable of usually running even after being subjected to an external injury, and more particularly to a safety tire having excellent durability and ride comfort in the running after the tire is subjected to an external injury.

2. Description of Related Art

In a pneumatic tire, e.g. a pneumatic tire for a passenger car, air is sealed in an inside of the tire under an internal pressure of about 250–350 kPa (absolute pressure, and so forth) to generate tension in a skeleton portion of the tire such as carcass, belt and the like, and by this tension it is possible to conduct deformation and restoration of the tire due to input to it. That is, constant tension is generated in the skeleton of the tire by holding its internal pressure of the tire within a given range to provide a load bearing function and to enhance the rigidity for providing basic performances required in the running of a vehicle such as traction, braking, cornering performances and the like.

When the tire held at the given internal pressure is subjected to an external injury, air leaks out through the external injury toward an exterior to reduce the internal pressure up to an atmospheric pressure or render into so-called puncture state, so that tension generated in the skeleton portion of the tire is substantially lost. As a result, the load bearing function as well as the traction, braking and cornering performances obtained by applying the given internal pressure to the tire are also lost and hence it is impossible to run the vehicle provided with such a tire.

For this end, there are many proposals with respect to safety tires capable of running even at the puncture state. As a pneumatic safety tire for automobiles, there are proposed, for example, tires of various types such as a tire having a double wall structure, a tire including a load bearing device therein, a tire strengthening a sidewall portion and so on. As a practically used technique among these proposals, there is a tire wherein a sidewall reinforcing layer made of a relatively hard rubber is arranged in an inner face of the tire about a sidewall portion of the tire from a shoulder portion to a bead portion. This type of tire is used as so-called run-flat tire mainly having an aspect ratio of not more than 60%.

However, the method of adding the sidewall reinforcing layer increases a tire weight by 30–40% and raises a longitudinal spring constant of the tire, so that there is a disadvantage of bringing about a serious degradation of rolling resistance and a lowering of ride comfort in the usual running before puncture. Therefore, this method badly affects the performances in the usual running, fuel consumption and environment, and is a technique being still poor in the general-purpose property.

On the other hand, as a pneumatic tire having a high tire section height and an aspect ratio of not less than 60%, there is mainly adapted a run-flat tire having such a structure that an internal support body such as a core or the like is fixed to a rim to support a load in the puncture for avoiding heat build-up of the sidewall portion during the running at a relatively high speed over a long distance.

In this case, however, the tire can not withstand to local repetitive stresses produced between the tire and the internal support body at a run flat state after the puncture, and hence the running distance after the puncture is limited to about 100–200 km. In addition, there is a problem that an operation of arranging the internal support body inside the tire and assembling the tire onto a rim is complicated and requires a long time. In this connection, there is proposed means for forming a difference in a rim diameter between one end side and the other end side in a widthwise direction of the rim to facilitate the insertion of the internal support body, but a satisfactory effect is not yet obtained.

Moreover, in order to prolong the running distance after the puncture of the run-flat tire having the internal support body therein, it is effective to add a skeletal member to render the tire structure into a more massive state, but the rolling resistance and ride comfort in the usual running are degraded by the addition of the skeletal member, so that there is no reality in the adoption of this means.

Furthermore, a tire wherein a composite body having closed cells is filled in an inner space of an assembly of a tire and a rim is disclosed, for example, in JP-A-6-127207, JP-A-6-183226, JP-A-7-186610 and JP-A-8-332805. The tires proposed in these documents are mainly limited to a special or small-size tire such as agricultural tire, rally tire, motorcycle tire, bicycle tire or the like. Therefore, there is not known the application to tires regarding the rolling resistance and ride comfort as important such as tires for passenger car, tires for truck and bus and so on. And also, the composite body is low in the expansion rate, so that the weight of the composite body having the closed cells is large and it is unavoidable to degrade the ride comfort against vibration and fuel consumption. Furthermore, the inside of the closed cell is atmospheric pressure, so that the use of the composite body instead of a high pressure air in the conventional pneumatic tire is functionally insufficient.

In Japanese Patent No. 2987076 is disclosed a puncture-free tire inserting a foamed filling member into an inner peripheral portion of the tire. In addition to the disadvantage due to the fact that the internal pressure is very close to an atmospheric pressure, however, since the foamed body is urethane-base, energy loss resulted from intermolecular hydrogen bond of urethane group is large and self-heating is high. Therefore, when such a foamed body made of urethane is filled in the tire, heat generation is caused in the foamed body by repetitive deformation during the running of the tire to largely lower the durability. And also, since something that is hard to form closed cells is used as a starting material, the resulting cells are easily connected to each other and it is difficult to hold a gas in the foamed body, and hence there is a disadvantage that a desired internal pressure of the tire (load bearing ability or a deflection controlling ability) is not obtained.

Moreover, JP-A-48-47002 proposes a puncture-free tire wherein a plurality of expanded pressure cellular bodies each formed by integrally covering and sealing an outer periphery of a multi-cell body mainly composed of closed cells with an outer coating of rubber, synthetic resin or the like having a thickness of 0.5–3 mm are filled in an inside of a tire so as to hold a given internal pressure. According to this technique, in order to make a pressure in the cell of the cellular body higher than an atmospheric pressure, an amount of a foaming agent compounded in a starting material for the formation of closed cells constituting the expanded pressure cellular body is set to an amount generating gas in an amount at least equal to or more than an internal volume of the tire, whereby it is aimed at the development of performances at least equal to those of the usual pneumatic tire.

In the above technique, in order to prevent the scattering of gas in the cell of the expanded pressure cellular body, the body is integrally covered and sealed with the outer coating, but only materials such as tube for automobile or a blend for the formation of the tube are exemplified as a material for the outer coating. In other words, the multi-cell body is covered and sealed with a soft elastic outer coating mainly composed of butyl rubber having a low nitrogen gas permeability, which is used in a tire tube or the like, and a plurality of such covered multi-cell bodies are filled in the tire. As the production method, an uncured tire tube as the soft elastic outer coating and a starting material for the formation of an uncured cellular body as an expanded pressure cellular body are used and disposed in an inside of a tire-rim assembly and expanded by heating to obtain a tire filled with foamed bodies. By the expansion of the cellular bodies is naturally discharged atmospheric air inside the tire through a small hole opened in the rim.

Since the internal pressure of the tire for passenger car is generally set to about 250–350 kPa as an absolute pressure at room temperature, it is guessed from an equation of gas state that a pressure in the above tire filled with the foamed bodies is made to about 1.5 times of the above internal pressure at a heating state (about 140° C.) for vulcanization and molding. However, such a pressure level brings about the lacking of vulcanization pressure and can not avoid to cause a blown. In order to avoid such a blown phenomenon, it is necessary that an amount of a foaming agent compounded is largely increased to raise a pressure generated by expansion or that a heating temperature is raised. However, in the method of increasing the amount of the foaming agent compounded, the internal pressure at room temperature largely exceeds 400 kPa by the increase of the foaming agent amount and hence it is difficult to use as a replacement of the conventional pneumatic tire. In the method of raising the heating temperature, the damage of the tire due to the heat aging becomes large and the durability of the tire is considerably degraded, so that there is caused a problem in the durability for use over a long time. On the other hand, many expanded pressure cellular bodies each covered with the soft elastic outer coating are disposed in the inside of the tire-rim assembly, so that a problem in view of the durability becomes large due to friction of the soft elastic outer coatings producing the above blown to each other, friction of the coating to the inner face of the tire and the inner face of the rim and the like. The above problems can be said to be large drawbacks resulted from the arrangement of many expanded pressure cellular bodies different from a case that a shape of the expanded pressure cellular body takes an integrally doughnut shape. And also, the small hole formed in the rim is effective to naturally discharge air of atmospheric pressure inside the tire due to the expansion of the expanded pressure cellular bodies, but serves as a scattering path of the gas in the cell of the expanded pressure cellular body and hence such a tire can not withstand for use over a long time.

Furthermore, the blend composition mainly composed of butyl rubber having a low nitrogen gas permeability for a tire tube or the like is used as the soft elastic outer coating, so that it is required to take a longer heating time for completing the vulcanization reaction at a temperature of about 140° C. because the butyl rubber is very slow in the reaction rate. This means a lacking of crosslinking density in the soft elastic outer coating, which can be said to be a factor of generating the peeling of the soft elastic outer coating (will be mentioned in detail later). Moreover, the prolonging of the heating time can not be said to be a good plan because the damage of the tire due to the aforementioned heat aging becomes larger and the lowering of the durability can not be avoided.

SUMMARY OF THE INVENTION

It is, therefore, an object of the invention to provide a tire capable of stably running even after the tire is subjected to an injury without sacrificing the rolling resistance and ride comfort in the usual running.

It is another object of the invention to provide a composite body suitable as a filling material inside the tire and a foaming resin composition usable as a starting material thereof.

The inventor has made various studies in order to solve the above problems and found that it is effective to provide a structure that gas is not easily leaked out from an inside of the tire even when being subjected to an external injury or the like for always and properly holding an internal pressure of the tire.

Namely, the gist and construction of the invention are as follows.

(1) In a tire arranging a composite body consisting of a continuous phase made of a resin and many closed cells in an inside of a hollow doughnut-shaped tire, an improvement wherein the composite body has a cell content of 80.00 vol % to 98.75 vol % and an internal pressure at 25° C. in the closed cell included therein is not less than 150 kPa as an absolute pressure.

(2) A tire according to the item (1), wherein the internal pressure at 25° C. in the closed cell included therein is not less than 200 kPa as an absolute pressure.

(3) A tire according to the item (1) or (2), wherein the continuous phase of the composite body is made of at least one of resins having a polar functional group in their molecule and polyolefin resins.

(4) A tire according to the item (3), wherein the resin having a polar functional group in molecule is at least one of a polyvinyl alcohol resin, an acrylonitrile copolymer, an acrylic copolymer, a vinylidene chloride copolymer, an acrylonitrile/styrene resin, a polyester resin and a nylon resin.

(5) A tire according to the item (3), wherein the polyolefin resin is at least one of a polyethylene resin, a polypropylene resin and a polystyrene/polyethylene copolymer.

(6) A tire according to any one of the items (1) to (4), wherein the continuous phase of the composite body is made of a polyvinyl alcohol resin.

(7) A tire according to any one of the items (1) to (4), wherein the continuous phase of the composite body is made of an acrylonitrile polymer, and the acrylonitrile polymer is at least one selected from acrylonitrile polymer, acrylonitrile/methacrylonitrile copolymer, acrylonitrile/methyl methacrylate copolymer and acrylonitrile/methacrylonitrile/methyl methacrylate terpolymer and has a glass transition point of not lower than 80° C.

(8) A tire according to any one of the items (1) to (4), wherein the continuous phase of the composite body is made of an acrylic polymer, and the acrylic polymer is at least one selected from methyl methacrylate resin, methyl methacrylate/acrylonitrile copolymer, methyl methacrylate/methacrylonitrile copolymer and methyl methacrylate/acrylonitrile/methacrylonitrile terpolymer.

(9) A tire according to any one of the items (1) to (4), wherein the continuous phase of the composite body is made of a vinylidene chloride polymer, and the vinylidene chloride polymer is at least one selected from vinylidene chloride/acrylonitrile copolymer, vinylidene chloride/methyl methacrylate copolymer, vinylidene chloride/ methacrylonitrile copolymer, vinylidene chloride/ acrylonitrile/methacrylonitrile copolymer, vinylidene chloride/acrylonitrile/methyl methacrylate copolymer, vinylidene chloride/methacrylonitrile/methyl methacrylate copolymer, vinylidene chloride/acrylonitrile/ methacrylonitrile/methyl methacrylate copolymer and has a glass transition point of not lower than 80° C.

(10) A tire according to any one of the items (1) to (4), wherein the continuous phase of the composite body is made of a nylon resin, and the nylon resin is at least one selected from nylon-6, nylon-11, nylon-12, nylon-6/66 copolymer and nylon-6/12 copolymer.

(11) A tire according to any one of the items (1) to (3), wherein the continuous phase of the composite body is made of at least one of a nylon resin, butyl rubber and a diene rubber.

(12) A tire according to any one of the items (1) to (11), wherein at least one gas selected from the group consisting of nitrogen, air, carbon dioxide, a linear or branched aliphatic hydrocarbon having a carbon number of 3 to 6, an alicyclic hydrocarbon having a carbon number of 3 to 6, and an aliphatic fluorocarbon or fluorohydrocarbon having a carbon number of 2 to 6 and containing no chlorine is included in the closed cells of the composite body.

(13) A tire according to the item (12), wherein a gas containing not more than 50% by weight of at least one selected from propane, normal butane, isobutane, pentane, isopentane and neopentane included in the aliphatic fluorocarbon or fluorohydrocarbon having a carbon number of 2 to 6 and containing no chlorine is included in the closed cells of the composite body.

(14) A tire according to any one of the items (1) to (13), wherein the continuous phase of the composite body has a gas permeability constant at 30° C. of not more than $300 \times 10^{-12}$ (cc. cm/cm$^2$·s·cmHg).

(15) A tire according to any one of the items (1) to (13), wherein the continuous phase of the composite body has a gas permeability constant at 30° C. of not more than $20 \times 10^{-12}$ (cc·cm/cm$^2$·s·cmHg).

(16) A tire according to any one of the items (1) to (13), wherein the continuous phase of the composite body has a gas permeability constant at 30° C. of not more than $2 \times 10^{-12}$ (cc·cm/cm$^2$·s·cmHg).

(17) A tire according to any one of the items (1) to (16), wherein an innerliner layer is provided on an inner peripheral face of the tire and made of a thermoplastic elastomer composition containing nylon resin having a melting point of 170–230° C. and a halide of isobutylene-paramethylstyrene copolymer in which an elastomer ingredient is dynamically cured to a gelation ratio of 50–95%.

(18) A tire according to the item (17), wherein the innerliner layer has a gas permeability constant at 30° C. of not more than $20 \times 10^{-12}$ (cc·cm/cm$^2$·s·cmHg).

(19) A composite body comprising a continuous phase and many closed cells, in which the continuous phase is made of at least one of a polyvinyl alcohol resin, an acrylonitrile resin, an acrylic copolymer, a vinylidene chloride copolymer, an acrylonitrile/styrene resin, a polyethylene resin, a polypropylene resin, a polyester resin, a polystyrene/polyethylene copolymer and a nylon resin, and an internal pressure at 25° C. in the closed cell is not less than 150 kPa as an absolute pressure.

(20) A composite body according to the item (19), wherein the internal pressure at 25° C. in the closed cell is not less than 200 kPa as an absolute pressure.

(21) A composite body according to the item (19) or (20), wherein at least one gas selected from the group consisting of nitrogen, air, carbon dioxide, a linear or branched aliphatic hydrocarbon having a carbon number of 3 to 6, an alicyclic hydrocarbon having a carbon number of 3 to 6, and an aliphatic fluorocarbon or fluorohydrocarbon having a carbon number of 2 to 6 and containing no chlorine is included in the closed cell.

(22) A tire arranging a composite body consisting of a continuous phase made of a resin and many closed cells in an inside of a hollow doughnut-shaped tire, wherein the composite body is formed by expanding a foaming composition containing 1–50% by weight of a foaming agent as an average content.

(23) A tire according to the item (22), wherein the foaming composition is resin particles sealing the foaming agent therein.

(24) A tire according to the item (22) or (23), wherein the foaming agent sealed in the foaming composition is at least one of a thermal-decomposable foaming agent, a liquefied fluoride of ethane, a liquefied linear aliphatic hydrocarbon having a carbon number of 3 to 6 and a fluoride thereof, a liquefied branched aliphatic hydrocarbon having a carbon number of 3 to 6 and a fluoride thereof and a liquefied alicyclic hydrocarbon having a carbon number of 3 to 6 and a fluoride thereof.

(25) A tire according to the item (24), wherein the thermal-decomposable foaming agent is at least one selected from dinitrosopentamethylene tetramine, azodicarbon amide, paratoluene sulfonyl hydrazine and a derivative thereof and oxybisbenzenesulfonyl hydrazine.

(26) A tire according to any one of the items (22) to (25), wherein the composite body consists of a resin matrix and many closed cells.

(27) A tire according to any one of the items (22) to (26), wherein at least one gas selected from the group consisting of nitrogen, air, carbon dioxide, fluorocarbon of ethane, a linear aliphatic hydrocarbon having a carbon number of 3 to 6 or its fluorocarbon, a branched hydrocarbon having a carbon number of 3 to 6 or its fluorocarbon and an alicyclic hydrocarbon having a carbon number of 3 to 6 or its fluorocarbon is included in the closed cells of the composite body.

(28) A tire according to any one of the items (22) to (26), wherein at least one gas selected from the group consisting of nitrogen, air, carbon dioxide and an organic gas having a carbon number of 3.

BRIEF DESCRIPTION OF THE DRAWINGS

The invention will be described with reference to the accompanying drawings, wherein.

DETAILED DESCRIPTION OF THE INVENTION

Figure 1:
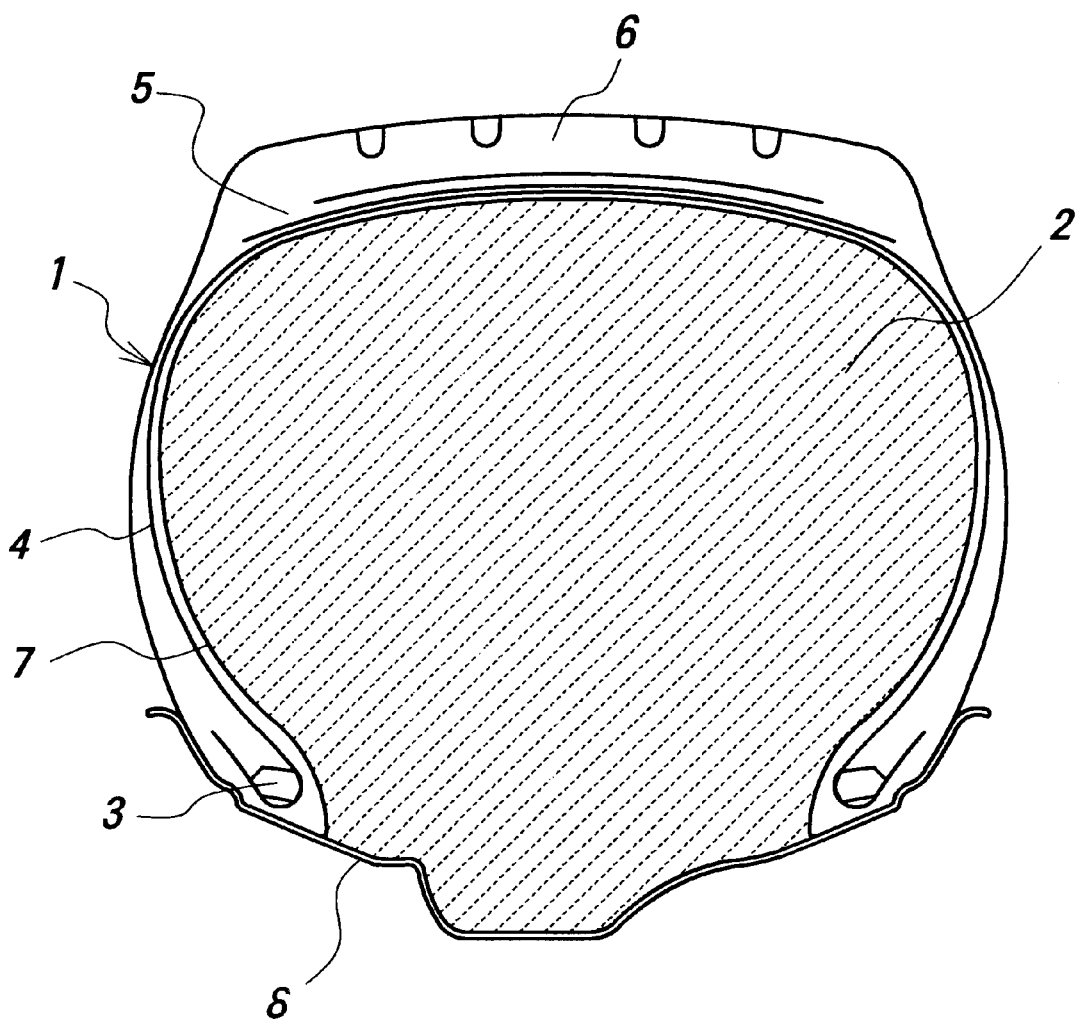
FIG. 1 is a diagrammatically section view of an embodiment of the tire according to the invention in a widthwise direction of the tire.

The tire according to the invention is explained with reference to FIG. 1 showing a widthwise section thereof.

That is, in the illustrated tire, a composite body 2 consisting of a continuous phase made of a resin and many closed cells is arranged in the inside of the tire 1. Moreover, the structure of the tire 1 is not particularly restricted as long as it is manufactured according to general automobile tires such as passenger car tires and the like. For instance, the illustrated tire is a general automobile tire and comprises a carcass 4 toroidally extending between a pair of bead cores 3, and a belt 5 and a tread 6 successively disposed on a crown portion of the carcass outward in a radial direction. Moreover, numeral 7 is an innerliner and numeral 8 a rim.

And also, the composite body 2 has closed cells wherein individual cells are surrounded with and isolated by a partition wall. It is important that a cell content in the composite body 2 is 80.00 vol % to 98.75 vol % and an internal pressure at 25° C. in the closed cell included therein is not less than 150 kPa, preferably not less than 200 kPa. That is, when the cell content is less than 80.00 vol %, if the composite body is deformed in the inside of the tire, stress sporadically concentrates in a continuous phase portion between the cells to easily create crack in the continuous phase and hence the durability of the composite body to repetitive deformation considerably degrades. While, when the cell content exceeds 98.75 vol %, the damaging degree of the composite body resulted from the external injury of the tire becomes large and the growing rate of the damage becomes fast, and hence the durability of the composite body to repetitive deformation considerably degrades even in this case.

The term "cell content" used herein is represented by a ratio of cell volume occupied in the volume of the composite body arranged inside the tire as a percentage and can concretely be calculated according to the following equation:

Cell content={1-(volume of resin or composition used for constituting the composite body/volume inside tire)}×100

Similarly, when the internal pressure at 25° C. in the closed cell is less than 150 kPa, the deflection of the composite body increases and the repeated deformation quantity during the running of the tire becomes large, so that the fatigue history of the composite body in the usual running before the occurrence of external injury in the tire increases and also the growing rate of the damage in the composite body resulted from the external injury of the tire becomes faster with the increase of the deformation quantity. Even in this case, the durability of the composite body to the repetitive deformation considerably degrades and the performances in the running at a state of creating the external injury of the tire are insufficient.

As means for developing the durability of the composite body used in the invention, there can be mentioned the following method. That is, air of about 200–300 kPa is filled between the composite body and the inner face of the tire during the usual running (before the occurrence of external injury) to positively compress the composite body inside the tire. In this way, it is possible to reduce a load bearing ratio of the composite body during the usual running and the fatigue history accompanied with the repeated deformation during the running of the tire can be decreased. As a result, even if air filled between the composite body and the inner face of the tire is scattered due to the occurrence of external injury in the tire, the running performances at a state of creating external injury of the tire are largely improved as compared with the case of not adopting the above method.

By arranging such a composite body 2 is provided an internal pressure required in the tire. That is, a structure capable of generating tension in the skeleton portion of the tire such as carcass, belt and the like is realized by arranging the composite body 2 in the inside of the tire to give a given internal pressure to the tire. Therefore, an adequate internal pressure is given to the tire by the composite body 2, so that it is not required to regulate the tire structure itself and hence there can be newly provided safety tires by utilizing general-purpose tires and general-purpose rims.

The tire provided on its inside with the composite body 2 has a characteristic that even if the tire is subjected to external injury, the lowering of tension in the casing as caused in the usual pneumatic tire is not easily caused. Because, when the tire is subjected to an external injury, a part of the composite body may be damaged at the inner face of the tire in the vicinity of the external injury and there is a possibility that gas in some closed cells at the damaged zone are scattered off into the exterior of the tire. However, such a phenomenon is compared to a case that the drop of the internal pressure merely occurs in an extremely local zone of the conventional pneumatic tire, so that tension as a tire casing is not lost by the local damage of the composite body 2 and hence the tire does not fall into puncture state as does in the conventional pneumatic tire. Furthermore, a probability of damaging the composite body 2 by the external injury of the tire is very low, and even if the composite body is subjected to the external injury, the zone is extremely restricted, so that the internal pressure given by the composite body 2 never lowers to an extent of spoiling the tire performances.

Further, although the vicinity of the damaged closed cells lowers to an atmospheric pressure, the closed cells surrounding them have an internal pressure of not less than 150 kPa, so that as the pressure surrounding them lowers, they are expanded to crush the zone of the damaged closed cells to thereby close the damaged zone, or it is possible to conduct so-called self-repairing.

In order to obtain a given internal pressure of the tire by the composite body 2, it is important that gas sealed in the closed cells of the composite body 2 under a given pressure does not leak out from the cells toward the outside of the composite body, or the continuous phase for the closed cells in the composite body 2 has a property hardly permeating the gas. As a material of the continuous phase, mention may concretely be made of a polyvinyl alcohol resin, an acrylonitrile copolymer, an acrylic copolymer, a vinylidene chloride copolymer, an acrylonitrile/styrene resin (AS), a polyethylene resin (PE), a polypropylene resin (PP), a polyester resin (PET), polystyrene/polyethylene copolymer (PS/PE), a nylon resin, a diene rubber, butyl rubber and the like. These materials can relatively easily form a foamed body in the tire and have a flexibility against input through the tire deformation and are particularly effective in the invention. However, the diene rubber and butyl rubber are favorable to be used together with the nylon resin from a viewpoint of using a material having a low gas permeability.

Especially, it is preferable to apply any one of polyvinyl alcohol resin, acrylonitrile polymer, acrylic polymer, vinylidene chloride polymer and nylon resin to the continuous phase of the composite body. As the acrylonitrile polymer is suitable at least one selected from acrylonitrile polymer, acrylonitrile/methacrylonitrile copolymer, acrylonitrile/methyl methacrylate copolymer and acrylonitrile/methacrylonitrile/methyl methacrylate terpolymer, and as the acrylic polymer is suitable at least one selected from methyl methacrylate resin (MMA), methyl methacrylate/acrylonitrile copolymer (MMA/AN), methyl methacrylate/methacrylonitrile copolymer (MMA/MAN)

and methyl methacrylate/acrylonitrile/methacrylonitrile terpolymer (MMA/AN/MAN), and as the vinylidene chloride polymer is suitable at least one selected from vinylidene chloride/acrylonitrile copolymer, vinylidene chloride/methyl methacrylate copolymer, vinylidene chloride/methacrylonitrile copolymer, vinylidene chloride/acrylonitrile/methacrylonitrile copolymer, vinylidene chloride/acrylonitrile/methyl methacrylate copolymer, vinylidene chloride/methacrylonitrile/methyl methacrylate copolymer, and vinylidene chloride/acrylonitrile/methacrylonitrilelmethyl methacrylate copolymer, and as the nylon resin is suitable at least one selected from nylon-6, nylon-11, nylon-12, nylon-6/66 copolymer and nylon-6/12 copolymer. Moreover, the nylon resin may be used in combination with butyl rubber. These materials are small in the gas permeability constant and low in the gas permeability, so that the gas in the closed cell is not leaked out toward exterior and the pressure in the closed cell can be held within a given range.

Among the above materials, it is favorable to use at least one polymer having a glass transition point of not lower than 80° C. and selected from homopolymer of acrylonitrile monomer, copolymer of acrylonitrile monomer, copolymer of acrylonitrile monomer and methylmethacrylate and/or vinylidene chloride having a content of acrylonitrile monomer of not less than 20% by weight. That is, these polymers are small in the gas permeability constant and low in the gas permeability, so that the gas in the closed cell is not leaked out toward exterior and the pressure in the closed cell can be held within a given range. The "acrylonitrile monomer" used herein means acrylonitrile and methacrylonitrile.

A temperature inside the tire changes in accordance with use conditions, but is about 60–70° C. in usual running. In general, the gas permeability constant of the polymer has a temperature dependence. That is, the gas permeability constant gradually increases at a temperature exceeding the glass transition point of the polymer. Therefore, by selecting the above polymer having a glass transition point higher than the use temperature inside the tire can perfectly be developed the gas permeability inherent to the polymer.

And also, the composite body 2 can be formed by expanding foaming agent-containing resin particles having an average content of foaming agent of 10–50% by weight, i.e. a foaming composition. That is, by using the foaming agent-containing resin particles, in which the average content of the foaming agent for forming the closed cells in the composite body is not less than 10% by weight, it is possible to decrease an absolute amount of the resin as a matrix in the composite body, and hence the weight reduction of the tire can be realized. Such a weight reduction of the tire contributes to improve the fuel consumption of the vehicle but also decreases unsprung weight to attain the improvement of the ride comfort and steering stability. While, when the average content of the foaming agent exceeds 50% by weight, it is difficult to obtain the composite body expected in the invention. Because, the matrix is not durable to the pressure in the cell during the foaming by heating.

Although the continuous phase of the composite body 2 dispersing the closed cells therein is made of the aforementioned high polymer, it is favorable to use a polymer having a softening point of 80–180° C. as the polymer. Because, the expanding temperature of the composite body can be controlled to a given range by regulating the softening point of the polymer to form a composite body suitable for the arrangement inside the tire.

Although there are the following various methods for arranging the composite body inside the tire, it is fundamental that the foaming composition is filled in the inside of the tire and expanded by heating the tire, or that the foaming composition is expanded while filling into the tire of a high temperature state by utilizing residual heat after the vulcanization. The "foaming composition" used herein means a composition formed by dispersing, sealing or impregnating a foaming agent made of a liquid evaporating under a given condition or a compound generating a gas through heat decomposition into the polymer constituting the continuous phase, which never expands at normal temperature and normal pressure because the vaporization is obstructed by the rigidity and gas barrier property of the continuous phase or energy required in the heat decomposition is lacking. As the tire is heated after the foaming composition is filled in the inside of the tire, the polymer constituting the continuous phase and the foaming agent are activated to promote the vaporization or heat decomposition of the foaming agent locked in the polymer and soften the surrounding polymer to thereby more promote the vaporization or heat decomposition, whereby the expansion is caused. Particularly, the fluidization of the polymer locking the foaming agent therein is predominant to the expansion, so that it is possible to control the foaming time by regulating the softening point of the polymer.

Although the temperature inside the tire under use conditions in usual markets is about 50–60° C., it can easily be guessed that when the composite body is filled in the inside of the tire, the tire temperature is further raised by a heat-storing property of the composite body. That is, if the softening point of the continuous phase is set to an extremely low value, there is a possibility that the tire temperature is rendered into a state higher than the softening point of the polymer constituting the continuous phase. If the tire temperature becomes higher than the softening point of the polymer constituting the continuous phase, the cell structure inside the continuous phase is disordered by fluidization of the continuous phase to bring about the continuing among the cells or serious degradation of the resistance to gas permeation in the continuous phase and lower the gas holding property of the composite body, so that the internal pressure in the tire lowers and hence the durability of the tire is obstructed. In order to surely obtain the tire provided in its inside with the composite body as expected in the invention, therefore, it is favorable to use the aforementioned polymer having a softening point in a temperature region of not lower than 80° C. that is enough to avoid the above problems. On the other hand, since the expansion is conducted by heating the tire filled with the foaming composition, as the softening point of the polymer becomes higher, it is required to raise the heating temperature of the tire. However, when the heating temperature of the tire is too high, there is a fear that the degradation of rubber is caused so as not to maintain the basic performances of the tire, so that it is preferable to use a polymer having a softening point of not higher than 180° C. The softening point of the polymer is preferably 90–160° C., more preferably 100–140° C.

Furthermore, the composite body 2 is favorable to be formed by using foaming compositions having different expansion starting temperatures. Because, when the foaming compositions having different expansion starting temperatures are included in the composite body, if the tire temperature rises and reaches above a certain value, a foaming agent having a higher expansion starting temperature in the foaming composition is expanded or vaporized, during which heat generation of the tire is consumed in the vaporization heat to control the rise of the tire temperature and suppress the heat aging of the tire.

Especially, the foaming composition is favorable to comprise a foaming composition A constituting the composite body inside the tire in usual use and having an expansion starting temperature of 90–160° C. and a foaming composition B having an expansion starting temperature higher by 10° C. or more than that of the foaming composition A. When the expansion starting temperature of the foaming composition A is lower than 90° C., there is a fear that the continuous phase matrix of the composite body is fused by heat generation of the tire in the usual use to bring about the continuing among the closed cells or the degradation of gas barrier property of the matrix. While, when the expansion starting temperature of the foaming composition A exceeds 160° C., there is a fear of heat-aging the tire by heating for the expansion of the foaming composition A.

On the other hand, the foaming composition B has a function that the expansion is started at a time of abnormal heat generation due to the lowering of the internal pressure, for example, to recover the internal pressure while absorbing heat, so that it is required to be at a non-expanding state under usual use. And also, in order to surely expand only the foaming composition A, the heating temperature of the tire should be set to a temperature higher by at least 5° C. than the expansion starting temperature of the foaming composition A, otherwise selective expansion is difficult. Therefore, the expansion starting temperature of the foaming composition B is required to be higher by not lower than 10° C., preferably not lower than 20° C. than the expansion starting temperature of the foaming composition A.

Further, a weight ratio of the foaming composition B to the foaming composition A is favorable to be 0.1–2.0. Because, when the weight it ratio of the foaming composition B to the foaming composition A is less than 0.1, even if the foaming composition B is expanded by the abnormal heat generation of the tire, since the absolute amount is so small, the heat absorbing effect or the effect of recovering the internal pressure is small and hence the effect of extending the runnable distance after the external injury of the tire becomes small, while when the weight ratio exceeds 2.0, it affects the tire weight and the degradation of rolling resistance and ride comfort is brought by the increase of the tire weight.

As the foaming composition A, a composite body mainly generating the internal pressure in the usual use is required, and is advantageous to be a combination of a matrix having a low gas permeability as mentioned below and a gas having a high vapor pressure even at a lower temperature such as nitrogen, air, carbon dioxide, liquefied fluoride of ethane, liquefied aliphatic or alicyclic hydrocarbon having a carbon number of 3 and a fluoride thereof.

As the foaming composition B, there is advantageously adapted a combination of a matrix having a low gas permeability even at a higher temperature such as acrylonitrile copolymer and isopentane, neopentane or the like having a relatively low vapor pressure and gasifying at the higher temperature to start expansion for expanding at a time of causing abnormal heat generation of the tire to develop the heat absorbing effect and the effect of recovering the internal pressure.

Particularly, the foaming composition is favorable to contain at least one selected from a heat decomposable foaming agent, fluoride of liquefied ethane, liquefied linear aliphatic hydrocarbon having a carbon number of 3–6 and a fluoride thereof, liquefied branched aliphatic hydrocarbon having a carbon number of 3–6 and a fluoride thereof, and liquefied alicyclic hydrocarbon having a carbon number of 3–6 and a fluoride thereof.

Next, the continuous phase of the composite body is recommended to have a gas permeability constant at 30° C. of not more than $300 \times 10^{-12}$ (cc·cm/cm$^2$·s·cmHg), preferably a gas permeability constant at 30° C. of not more than $20 \times 10^{-12}$ (cc·cm/cm$^2$·s·cmHg), more preferably a gas permeability constant at 30° C. of not more than $2 \times 10^{-12}$ (cc·cm/cm$^2$·s·cmHg). Considering the fact that the innerliner layer in the usual pneumatic tire has a sufficient internal pressure holding function at a level of a gas permeability constant of not more than $300 \times 10^{-12}$ (cc·cm/cm$^2$·s·cmHg), the gas permeability constant at 30° C. with respect to the continuous phase of the composite body should also be not more than $300 \times 10^{-12}$ (cc·cm/cm$^2$·s·cmHg). At such a level of the gas permeability constant, it is required to conduct the supplement of the internal pressure every 3–6 months, so that the gas permeability constant is recommended to be not more than $20 \times 10^{-12}$ (cc·cm/cm$^2$·s·cmHg), more preferably not more than $2 \times 10^{-12}$ (cc·cm/cm$^2$·s·cmHg) from a viewpoint of the maintenance.

As a gas constituting the closed cell in the composite body, mention may be made of at least one selected from nitrogen, air, carbon dioxide, linear and branched aliphatic hydrocarbon having a carbon number of 3 to 6, alicyclic hydrocarbon having a carbon number of 3 to 6, and aliphatic fluorocarbon and fluorohydrocarbon containing no chlorine. Among them, the cell of the foamed body is favorable to contain an organic gas having a carbon number of 3. It is because the organic gas having a carbon number of 3 is relatively high in the vapor pressure and can maintain the internal pressure of the tire even at a lower temperature.

Moreover, the method of producing the composite body having the closed cells is not particularly limited, but it is favorable to use a foaming agent. As the foaming agent, mention may be made of a heat decomposable foaming agent generating a gas through heat decomposition, a high-pressure-compressed gas, a liquefied gas and so on. As the heat decomposable foaming agent, at least one selected from dinitrosopentamethylene tetramine (DPT), azodicarbonamide (ADCA), paratoluenesulfonyl hydrazine (TSH) and its derivative, and oxybisbenzenesulfonyl hydrazine (OBSH) is suitable.

Particularly, almost of the heat decomposable foaming agents have a characteristic of generating nitrogen, so that the composite body obtained by properly controlling the reaction contains nitrogen in its cell.

And also, when a resin for the continuous phase constituting the composite body is melted and filled in the tire together with air under a high pressure to form the composite body, air remains in the cell. Furthermore, there is a method wherein propane, butane, pentane, cyclopropane, cyclobutane, cyclopentane or the like is liquefied under a high pressure and emulsion-polymerized while being dispersed into a reaction solvent in the polymerization of the resin for the continuous phase. Thus, a gas components such as propane, butane, pentane, cyclopropane, cyclobutane, cyclopentane and the like can be sealed in the resin continuous phase at a liquid state to obtain foaming resin particles. When these particles are filled in the tire and heated to form the composite body, propane, butane, pentane, cyclopropane, cyclobutane and cyclopentane are sealed in the cells. Moreover, as an isomers of the butane and pentane, mention may be made of isobutane, isopentane, neopentane and the like.

Further, a tire provided in its inside with a composite body can be obtained by filling foaming resin particles sealed with a liquefied gas such as propane, butane, pentane or the like in the tire together with a melt of the resin for the continuous phase constituting the composite body and heating them.

Moreover, the above gases such as butane, isobutane, pentane, isopentane, neopentane and the like are hydrocarbon and are relatively high in the solubility to rubber, so that there is caused a fear that the internal pressure of the cell gradually lowers accompanied with the use over a long time and hence the degradation of the tire performances is brought about. Further, these gases have a flammability under normal temperature and normal pressure, so that it is necessary to keep work-handling conditions in an installation taking the greatest care on flashing and explosion at not only a production course of a product but also a full step from sending and storing of starting materials to forwarding of the product, which may impose a great burden in view of the productivity.

In this case, problems resulted from the lowering of the internal pressure in the cells of the composite body and the flammability of the gas in the cell can be eliminated by using a composition of aliphatic fluorocarbon or fluorohydrocarbon containing no chlorine as the gas in the cells of the composite body. That is, the aliphatic fluorocarbon or fluorohydrocarbon containing no chlorine can reduce the solubility to rubber through fluorination as compared with the case of using usual hydrocarbon, so that the lowering of the pressure in the closed cell of the composite body is slight as compared with the case of using the usual hydrocarbon, and hence there is a merit that the internal pressure in the cell and hence the internal pressure of the tire can be held over a long time. For example, even when the tire performances are improved by applying a rubber having a less heat build-up or a rubber having a high gripping property to it, if the internal pressure of the tire is lowered, there is frequently caused a problem that these performances can not sufficiently be developed. When technique of the present invention technique is applied to such a problem, however, the lowering of general tire performances such as rolling resistance, steering stability, ride comfort and the like can be suppressed because an adequate internal pressure is maintained over a long time.

And also, the aliphatic fluorocarbon or fluorohydrocarbon containing no chlorine is inflammable, so that there can be avoided problems such as flashing, dust and explosion at the stage of handling the starting materials. Even if such a substance is scattered out into air, it is advantageous because it has no ozone decomposing action.

And also, a tire provided in its inside with a composite body can be obtained by filling the foaming resin particles sealed with a liquefied gas such as fluorinated propane, butane, pentane or the like in the tire together with a melt of the resin for the continuous phase constituting the composite body and heating them.

Furthermore, it is favorable that the gas sealed in the closed cell of the composite body 2 is two kinds or more. Because, when different kinds of gases are included in the composite body, the internal pressure of the tire can be adjusted to a desired range in accordance with the change of an outside air temperature or a tire temperature.

Namely, the sealing of two kinds or more of gases in the composite body means the inclusion of gases having different vapor properties in the composite body. For instance, when two kinds of gases A and B are included in the composite body, the internal pressure at 25° C. of not less than 200 kPa in the closed cells is maintained mainly by the gas A, while a gas having a low vapor pressure at the same temperature or a low temperature at the same vapor pressure with respect to the gas A is used as the gas B. In other words, when the gas B has a characteristic that it is liquid when the tire is not used or the tire temperature is low and is vaporized when the tire temperature is raised above a temperature region in the usual and continuous use, it is possible that when the tire temperature rises above the given region, the gas B of liquid state is vaporized and a further temperature rise of the tire is suppressed by the vaporization heat. As a result, the improvement of the tire durability is attained.

And also, when a substance being gas at the usual use temperature region of the tire and being liquefied at a lower temperature region of not higher than 0° C. is included in the composite body as a gas B or a third gas C, if the tire is rendered into a lower temperature on snow or ice road in winter season, a part of the included gases is liquefied, whereby the internal pressure of the tire can be lowered. By such a lowering of the internal pressure is enlarged a ground contact area of the tire, which is effective to improve the tire performances on the snow or ice road.

The control of abnormal temperature rise of the tire and the enlargement of the ground contact area of the tire as mentioned above can be attained by selectively using the kind of the gases in accordance with the purpose, so that there can be provided a tire simultaneously establishing the durability and tire performances on snow or ice road by properly mixing the main gas A with the gases B and C. Moreover, the gas A is favorable to be existent in an amount of at least 50 mass % for giving a given internal pressure to the tire.

Incidentally, fluorinated ethane, propane and cyclopropane and fluorides thereof are suitable as the gas A, and cyclopropane, isobutane, n-butane, neopentane, cyclobutane, isopentane, n-pentane, cyclopentane, hexane, cyclohexane and fluorides thereof are suitable as the gases B and C.

Two or more gases can be sealed in the foamed body according to the following three modes. That is, a first mode is a case that two or more gases are included in one closed cell as a mixed gas and the closed cells each containing such a mixed gas form at least a part of entire closed cells. Then, a second mode is a case that one kind of gas is included in individual closed cells but the closed cells having different gases are existent. A third mode is a combination of the first mode and the second mode.

The composite body 2 containing two or more gases sealed therein is arranged in the inside of the tire to apply a given internal pressure, whereby the internal pressure required in the tire is obtained. That is, the given internal pressure is applied to the tire by arranging the composite body 2 in the inside of the tire instead of the air filling in the tire, whereby a structure capable of generating tension in the skeleton portion of the tire such as carcass, belt and the like. Since an adequate internal pressure is given to the tire by the composite body 2, therefore, it is not required to restrict the tire structure itself, so that there can be provided new safety tires by utilizing general-purpose tires and general-purpose rims.

Furthermore, an objective tire can be obtained by coating surfaces of the foaming resin particles with a surfactant, an oiling agent or the like and then expanding in the tire under heating. Moreover, an objective tire can be obtained by previously expanding resin particles sealing the liquefied gas therein under heating to form substantially spherical hollow balloon and filling them in the tire under compression.

The tire according to the invention is characterized in that the pressure in the closed cell of the composite body arranged inside the tire is higher than an atmospheric pressure. The realization of such a tire is greatly indebted to the following novel production methods. Although these production methods will be concretely described below, it is favorable to control the formation growth of the cells by monitoring internal pressure of the tire and temperature inside the tire and properly adjusting them at production stages even in any methods.

In the first method, a given amount of a foaming composition is charged into an inside of a tire, and the tire is assembled onto a rim, and then the tire-rim assembly is heated to conduct expansion inside the tire. Moreover, the heating is carried out by utilizing an oven, a steam, a microwave or an electron beam, which is similar even in the methods mentioned below.

In the second method, a starting material forming a continuous phase of a composite body is melted and a heat decomposable foaming agent (including an expansion assistant) added thereto, which are poured into an inside of a tire-rim assembly after assembling a tire onto a rim and then the tire-rim assembly is heated to conduct expansion inside the tire.

In the third method, butane, propane, pentane or the like is liquefied and sealed in hollow particles of a high polymer such as Expancel (trade mark) or the like and poured into an inside of a tire-rim assembly after assembling a tire onto a rim and then the tire-rim assembly is heated to conduct expansion inside the tire.

In the fourth method, a starting material forming a continuous phase of a composite body is melted and poured at a fluidized state into an inside of a tire-rim assembly together with high pressure air or a high pressure gas such as $CO_2$, $N_2$ or the like to form a composite body in the inside of the tire-rim assembly.

In the fifth method, a foaming composition is shaped into a doughnut and placed in an inside of a tire, and the tire is assembled onto a rim, and then the tire-rim assembly is heated to conduct expansion inside the tire. Moreover, it is not necessarily required to shape the foaming composition into the doughnut, but the formation of doughnut is favorable from a viewpoint of the workability and the uniformization of the filling.

In the sixth method, butane, propane, pentane or the like is liquefied and sealed in hollow particles of a high polymer such as Expancel (trade mark) or the like and filled in an inside of a tire-rim assembly together with a melt of a resin forming a continuous phase of a composite body and then the tire-rim assembly is heated, as required, to conduct expansion inside the tire.

In the seventh method, butane, propane, pentane or the like is liquefied and sealed in hollow particles of a high polymer such as Expancel (trade mark) or the like and previously expanded under heating to form substantially spherical hollow balloon, and then they are filled in an inside of a tire-rim assembly under compression.

Among the above methods, it is favorable to produce a tire by a method as mentioned below. That is, a tire after usual building through vulcanization is assembled onto a rim to form a tire-rim assembly, and a foaming composition including a polymer as a continuous phase matrix of a composite body and a foaming agent is filled in an inside of the tire-rim assembly and then the foaming composition is expanded inside the tire-rim assembly to obtain a tire filled with a composite body.

In this case, the filling and expansion of the foaming composition is important to be carried out while rotating the tire-rim assembly. That is, some time is taken for filling the required amount of the foaming composition, so that a difference in an expansion ratio is caused between the foaming composition just after the filling start and the foaming composition immediately before the completion of the filling due to a difference of temperature history. In the invention, the difference of temperature history can be decreased by rotating the tire-rim assembly at a proper speed, whereby a further uniformization of the expansion ratio in the foaming composition can be attained.

When the foaming composition made of particles sealing the foaming agent therein is particularly used, even if the difference of expansion ratio is caused between the foaming composition particles just after the filling start and the foaming composition particles immediately before the completion of the filling due to a difference of temperature history, the fusing between the particles in the expansion course can be delayed by rotating the tire at a proper speed, and hence the particles having the difference of expansion ratio can uniformly be dispersed in the expansion course to avoid uneven distribution of particles having a high expansion ratio and particles having a low expansion ratio in the tire. Especially, the rotating speed of the tire is favorable to be not less than 5 rpm, particularly not less than 10 rpm.

It is favorable that the filling of the foaming composition in the inside of the tire-rim assembly is carried out in such a cooling course of the tire that the temperature of the tire after the build-up through vulcanization is lowered to room temperature region. The reason therefor is described in detail below.

In a building step of a tire, uncured materials forming a belt, a carcass and the like are stuck on, for example, a shaping drum to form a green tire, and the green tire is placed on a vulcanization mold and subjected to building-up through vulcanization by inducing a crosslinking reaction by heating under pressure to obtain a product tire. The tire taken out from the mold after the completion of the vulcanization step is poor in the shape holding property and is in a unstable state because it is at an elevated temperature state. Therefore, it is usual that the tire of the higher-temperature state is subjected to a so-called post-cure inflation of shaping by applying a proper internal pressure to the tire to obtain a tire product of a sound shape having no strain.

Now, the inventor noticed heat of the tire taken out from the vulcanization mold and has made various studies with respect to a method of advantageously filling the foaming composition indispensable in the tire in the inside of the tire-rim assembly while utilizing such a heat and attempting the stabilization of the shape at a cooling step required in the conventional technique, and as a result the above preferable method has been accomplished.

In a method of giving an internal pressure to a tire after the completion at the cooling step by filling and expanding the foaming composition, there are mentioned the following drawbacks.

At first, in order to expand the foaming composition, the tire-rim assembly filled with the foaming composition should be heated to an adequate temperature, so that the tire may be heat-aged to no small extent by such a heating. As a result, there is feared that the tire becomes hard and the ride comfort and durability are degraded.

And also, a new heat energy is required for the expansion, which is uneconomical. Furthermore, it is required to establish a new heating step and an installation for the expansion, which is unfavorable from a viewpoint of productivity.

In this connection, when the foaming composition is filled in a tire-rim assembly in which a tire is assembled onto the rim just after being taken out from the mold, heat remaining the tire can be utilized, and the filling and expansion of the foaming composition indispensable in the tire can be carried out properly and cheaply while conducting the post-cure inflation required in the conventional technique.

In the invention, it is advantageous that the temperature of the tire-rim assembly at a time of starting the filling of the foaming composition is higher than the expansion starting temperature of the foaming composition. That is, when the temperature of the tire-rim assembly at a time of starting the filling of the foaming composition is lower than the expansion starting temperature of the foaming composition, there may be caused problems that a proper expansion is not produced in the inside of the tire-rim assembly, and a large distribution difference in the expansion ratio inside the tire-rim assembly is caused to conduct ununiform expansion because the heating should be conducted for sure expansion, and the like, so that it is difficult to obtain the tire expected in the invention.

The temperature of the tire-rim assembly at a time of starting the filling of the foaming composition is higher than the expansion starting temperature of the foaming composition and is particularly favorable to have a difference to the expansion starting temperature within 40° C. The reason is as follows. That is, some time is taken for filling the required amount of the foaming composition and also the difference of expansion ratio is caused between particles of the foaming composition just after the filling start and particles of the foaming composition immediately before the completion of the filling due to the difference of temperature history, and such a difference of expansion ratio badly affects the tire performances to no small extent. For example, the weight becomes ununiform to degrade the uniformity, which induces the occurrence of vibrations in the use of the tire to degrade the ride comfort, steering stability and fuel consumption.

By making the tire temperature at the time of starting the filling of the foaming composition higher than the expansion starting temperature of the foaming composition, particularly rendering the difference to the expansion starting temperature within 40° C., the difference of the expansion ratio between the foaming composition just after the filling start and the foaming composition immediately before the completion of the filling due to the difference of temperature history is suppressed to advantageously solve the above problem. Especially, when the temperature difference is made not higher than 30° C., preferably not higher than 20° C., the more uniformization of the expansion ratio in the foaming composition can be attained.

And also, when the foaming composition is particles sealing the foaming agent therein, the filling of the foaming composition into the tire-rim assembly can be facilitated. As a result, the filling time of the foaming composition is shortened and the difference of temperature history becomes smaller, so that the composite body can easily be obtained at a uniform expansion ratio.

Then, it is advantageous to fill the foaming composition together with a gas. It is because the foaming composition can easily and surely be filled in the tire-rim assembly and the filling is completed in a short time and the difference of temperature history becomes further smaller. As the gas used herein, incombustible gas such as nitrogen, fluoro gas or the like and air having a lower oxygen concentration are suitable.

Similarly, in order to reduce the difference of temperature history more, it is favorable to heat the foaming composition and the gas, as a carrier, to a temperature lower than the expansion starting temperature but a vicinity of such a latter temperature before the filling.

On the other hand, the tire is common to provide an innerliner layer in its inner peripheral face. The innerliner layer is favorable to be made of a thermoplastic elastomer composition comprising nylon resin having a melting point of 170–230° C. and a halide of isobutylene-paramethylstyrene copolymer in which an elastomer ingredient is dynamically cured to a gelation ratio of 50–95%. It is because the nylon resin forms a continuous phase, which is different from the conventional innerliner layer composed mainly of butyl rubber, so that the gas permeability becomes very low and hence the function of the innerliner layer can be strengthened. While, by using the thermoplastic elastomer composition wherein the elastomer ingredient including the halide of isobutylene-paramethylstyrene copolymer is dynamically cured to a gelation ratio of 50–95% is obtained an innerliner layer being rich in the flexibility and having excellent heat resistance and durability. By using such an innerliner layer can be created an environment that it is facilitated to retain the gas in the closed cells of the composite body.

Moreover, the gelation ratio is a value calculated according to the following equation when the composition pelletized after biaxial kneading is subjected to Soxhlet extraction with acetone in a water bath for 8 hours and the residue is further subjected to Soxhlet extraction with n-hexane for 8 hours in order to extract an uncured elastomer ingredient with the solvent and then extracts with acetone and n-hexane are dried by removing the solvent to measure weights thereof. Gelation ratio (%)=[weight of full composition−{(amount extracted with acetone+amount extracted with n-hexane)−amount of stearic acid}]/weight of full composition×100

Furthermore, the innerliner layer is favorable to have a gas permeability constant at 30° C. of not more than $20 \times 10^{-12}$ (cc·cm/cm$^2$·s·cmHg). Even when the gas in the cells leaks out of the composite body by some reasons, if the gas permeability of the innerliner layer is sufficiently low, the leakage of the gas in the cells of the composite body toward the outside of the tire becomes less and the internal pressure of the tire is advantageously held. That is, the gas permeability of the innerliner layer is a factor directly deciding the pressure holding property of the tire as a pressure container. Of course, it is basic that the gas permeability of the continuous phase constituting the composite body is low, and it is ideal that a material having a low gas permeability is further used in the innerliner layer.

Figure 2:
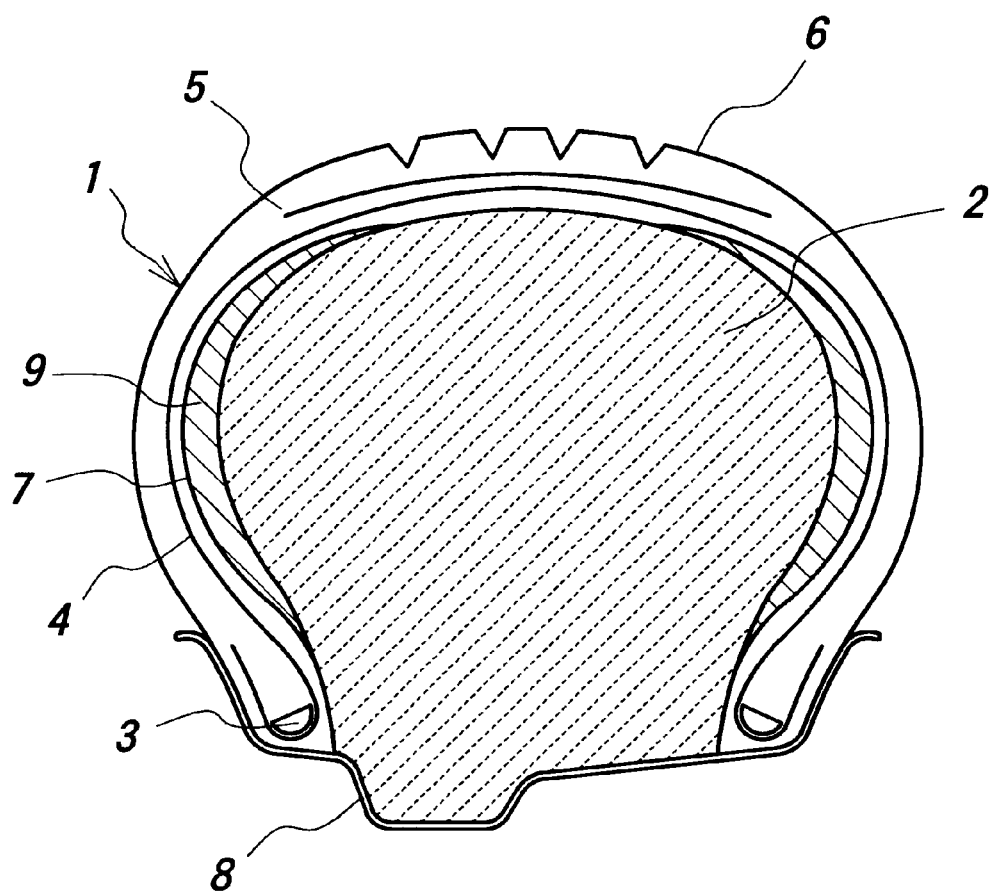
FIG. 2 is a diagrammatically section view of another embodiment of the tire according to the invention in a widthwise direction of the tire.

Although the application of the composite body to the general-purpose tire is shown in FIG. 1, it is possible to apply the composite body to a tire having a structure suitable for running at a run-flat state as shown in FIG. 2. That is, in the tire shown in FIG. 2, a sidewall portion is reinforced by arranging a sidewall reinforcing layer 9 made of a hard rubber in an inside of the sidewall portion of the tire.

Figure 3:
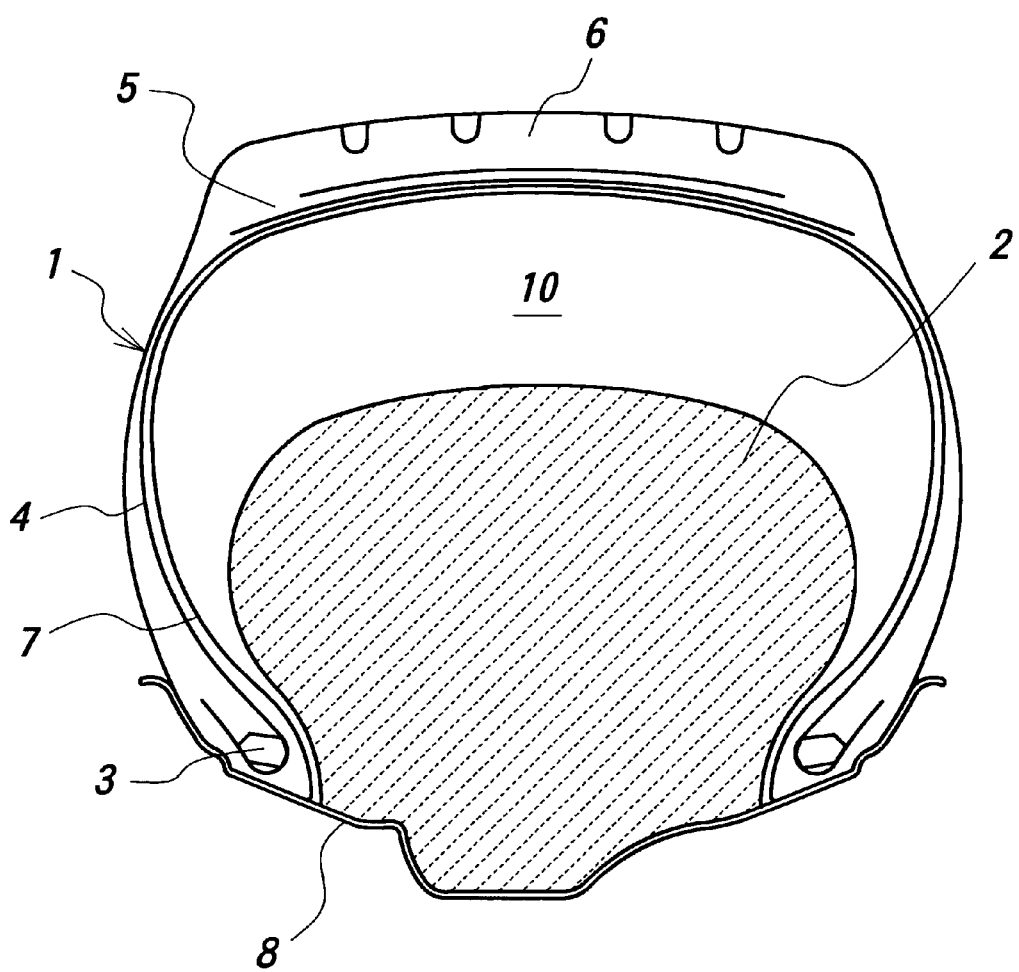
FIG. 3 is a diagrammatically section view of yet another embodiment of the tire according to the invention in a widthwise direction of the tire.

Further, FIG. 3 is a diagrammatical section view of a tire wherein the internal pressure is ensured by filling the composite body 2 and further air 10 is filled to make up the internal pressure while contracting the composite body 2. In this case, as the tire is subjected to external injury, air is scattered off toward the exterior, but the composite body is expanded by a pressure difference produced after the scattering of air, whereby an internal pressure enough to run over a restricted distance, i.e. deflection controlling ability and load bearing function can be developed by the composite body, so that the tire has satisfactory performances as a run-flat tire.

The following examples are given in illustration of the invention and are not intended as limitations thereof.

EXAMPLES 1–37

Comparative Examples 1–7

Tires for passenger cars having a tire size of 185/70R14 are prepared by applying one of the composite bodies having various specifications shown in Tables 1–6 to a tire having a structure shown in FIGS. 1 or 2 and assembling it onto a rim having a size of 5.5J×14. In this case, the tire 1 is made according to a general structure in the respective tire kind and size. Moreover, kinds of resins constituting the continuous phase of the composite body in Tables 1–6 are shown in Table 7. Similarly, kinds of rubber compositions for the innerliner layer are shown in Table 8, and a sidewall reinforcing rubber composition is shown in Table 9, respectively.

And also, a pressure in the closed cell shown in Tables 1–6 is calculated according to the following equation (A) based on the following definition.

$$\text{Pressure in cell (kPa)} = [(Wt/\rho s)/Vt]101.325 \quad (A)$$

wherein

Wt: weight of composite body filled in tire

Vt: inner volume of tire being filled

ρs: specific gravity of composite body sampled from tire under atmospheric pressure and is represented by ps=Ws/Vs, in which Vs: volume of composite body sampled from tire under atmospheric pressure Ws: weight of composite body sampled from tire Moreover, the pressure in the cell in Comparative Example 7 and Example 19 of Table 4 is represented by multiplying the above obtained pressure in cell by a coefficient defined in the following equation (B), in another word, a reciprocal of compression ratio due to the additional filling of a gas into the composite body.

$$\text{(Compression ratio of composite body by filling a gas)} = [Vt - \{Vg/(Pg/101.325)\}]/Vt \quad (B)$$

wherein

Vg: volume of the gas additionally filled in tire after the filling of composite body under atmospheric pressure Pg: pressure of the gas additionally filled in tire after filling of the composite body (kPa)

With respect to each of the thus obtained tires, deflection quantity of the tire is measured before and after the running on a drum over 5000 km under a load of 450 kgf, and a change of deflection quantity before and after the running on the drum (height of the tire before the running under load–height of the tire after the running under load) is represented by an index on the basis that the height of each tire before the running under load is 100. The smaller the index value, the better the property.

As one of important abilities to be developed by the tire, there is a load bearing ability. In the conventional tire, such an ability is developed by filling air in the inside of the tire, and an internal pressure is measured for judging a quantity of the ability. In the tire according to the invention, however, a gas such as air or the like is not fundamentally filled in the inside of the tire, so that so-called internal pressure can not be measured.

The "load bearing ability" used herein means that the inside of the tire has a force durable to external force. Such a force is developed by air filled in the inside in the conventional tire, and by the composite body filled in the inside in the tire according to the invention. If both are countervailing to each other, the tire holds the original shape to cause no trouble in the running. As the force from the inside of the tire is decreased by leakage of air from the inside or the like, however, the tire is gradually deformed by the external force to cause a deflection phenomenon. The leakage of air from the inside means that in the conventional pneumatic tire, air filled in the tire leaks out toward the outside of the tire and in the tire according to the invention, the gas included in the cells of the composite body leaks out from the inside of the composite body and further toward the outside of the tire.

For this end, the increase of deflection quantity in the tire is measured as an indication grasping the change of load bearing ability in the tire according to the invention.

Further, the tire after the running on the drum is mounted onto a passenger car of 2000 cc, and subjected to external injury by passing a nail of 3 mm in diameter and 3 cm in length from an outside of a tire tread through a tread and then run on a test circuit course at 90 km/h under a load corresponding to a total weight of four crewmen over 500 km at maximum, during which a runnable distance of not less than 200 km is determined to be acceptable.

These measured results are also shown in Tables 1–6.

TABLE 1

|  | Comparative Example 1 | Comparative Example 2 | Comparative Example 3 | Comparative Example 4 | Example 1 | Example 2 | Example 3 | Example 4 |
|---|---|---|---|---|---|---|---|---|
| Kind of resin or composition constituting continuous phase of composite body | — | — | — | — | 1 | 1 | 1 | 1 |
| Use volume (1) of resin or composition constituting continuous phase of composite body | — | — | — | — | 1.2 | 1.2 | 1.2 | 1.2 |
| Form of cell | — | — | — | — | closed cell | closed cell | closed cell | closed cell |
| Ingredient in cell | — | — | — | — | nitrogen | nitrogen | nitrogen | nitrogen |
| Kind of heat decomposable foaming agent (*) | — | — | — | — | ADCA | DPT | OBSH | TSH |
| Amount of heat decomposable foaming agent used (kg) | — | — | — | — | 0.36 | 0.41 | 0.72 | 0.72 |
| Kind of foaming assistant (**) | — | — | — | — | UREA | UREA | — | — |
| Amount of foaming assistant used (kg) | — | — | — | — | 0.1 | 0.05 | — | — |
| Cell content calculated (vol %) (***) | — | — | — | — | 95.00 | 95.00 | 95.00 | 95.00 |
| Pressure in cell (kPa) | — | — | — | — | 300 | 300 | 300 | 300 |
| Presence or absence of innerliner rubber layer | presence | presence | presence | absence | presence | presence | presence | presence |
| Kind of innerliner rubber | A1 | A1 | A2 | — | A1 | A1 | A1 | A1 |
| Presence or absence of sidewall reinforcing rubber | absence | presence | presence | presence | absence | absence | absence | absence |
| Initial internal pressure of tire (kPa) | 300 | 300 | 300 | 300 | — | — | — | — |

TABLE 1-continued

|  | Comparative Example 1 | Comparative Example 2 | Comparative Example 3 | Comparative Example 4 | Example 1 | Example 2 | Example 3 | Example 4 |
| --- | --- | --- | --- | --- | --- | --- | --- | --- |
| Increase of deflection quantity of tire after the running on drum over 5000 km (%) | 2.5 | 2.5 | 2.2 | 32.5 | 0.2 | 0.2 | 0.2 | 0.2 |
| Runnable distance of tire after being subjected to external injury (km) | 1.5 tire breakage | 200 trouble | 200 trouble | 200 trouble | 500 no trouble | 500 no trouble | 500 no trouble | 500 no trouble |

(*) ADCA: Vinyhole AC#3 made by Eiwa Kasei Kogyo Co., Ltd.
DPT: Cellular D made by Eiwa Kasei Kogyo Co., Ltd.
TSH: Unihole H made by Eiwa Kasei Kogyo Co., Ltd.
OBSH: Neocelbon P#100 made by Eiwa Kasei Kogyo Co., Ltd.
(**) Foaming assistant UREA: Cellpaste 101W made by Eiwa Kasei Kogyo Co., Ltd.
(***) Cell content: {1-(use volume of resin constituting composite body/inner volume of tire)} × 100; inner volume of tire is 24 liters

TABLE 2

|  | Example 5 | Example 6 | Example 7 | Example 8 | Example 9 | Example 10 | Example 11 | Example 12 |
| --- | --- | --- | --- | --- | --- | --- | --- | --- |
| Kind of resin or composition constituting continuous phase of composite body | 2 | 3 | 4 | 5 | 6 | 7 | 8 | 1 |
| Use volume (1) of resin or composition constituting continuous phase of composite body | 2.0 | 2.0 | 2.0 | 2.0 | 2.0 | 2.0 | 2.0 | 1,2 |
| Form of cell | closed cell | closed cell | closed cell | closed cell | closed cell | closed cell | closed cell | closed cell |
| Ingredient in cell | propane | cyclo-propane | propane | butane | pentane | butane | butane | nitrogen |
| Kind of heat decomposable foaming agent (*) | — | — | — | — | — | — | — | OBSH |
| Amount of heat decomposable foaming agent used (kg) | — | — | — | — | — | — | — | 0.72 |
| Kind of foaming assistant (**) | — | — | — | — | — | — | — | — |
| Amount of foaming assistant used (kg) | — | — | — | — | — | — | — | — |
| Cell content calculated (vol %) (***) | 91.67 | 91.67 | 91.67 | 91.67 | 91.67 | 91.67 | 91.67 | 95.00 |
| Pressure in cell (kPa) | 300 | 300 | 300 | 300 | 300 | 300 | 300 | 300 |
| Presence or absence of innerliner rubber layer | presence | presence | presence | presence | presence | presence | presence | presence |
| Kind of innerliner rubber | A1 | A1 | A1 | A1 | A1 | A1 | A1 | A1 |
| Presence or absence of sidewall reinforcing rubber | absence | absence | absence | absence | absence | absence | absence | absence |
| Initial internal pressure of tire (kPa) | — | — | — | — | — | — | — | — |
| Increase of deflection quantity of tire after the running on drum over 5000 km (%) | 0.3 | 0.3 | 0.3 | 0.4 | 0.5 | 0.5 | 0.5 | 0.4 |
| Runnable distance of tire after being subjected to external injury (km) | 500 no trouble | 500 no trouble | 500 no trouble | 500 no trouble | 500 no trouble | 500 no trouble | 500 no trouble | 500 no trouble |

(*) ADCA: Vinyhole AC#3 made by Eiwa Kasei Kogyo Co., Ltd.
DPT: Cellular D made by Eiwa Kasei Kogyo Co., Ltd.
TSH: Unihole H made by Eiwa Kasei Kogyo Co., Ltd.
OBSH: Neocelbon P#100 made by Eiwa Kasei Kogyo Co., Ltd.
(**) Foaming assistant UREA: Cellpaste 101W made by Eiwa Kasei Kogyo Co., Ltd.
(***) Cell content: {1-(use volume of resin constituting composite body/inner volume of tire)} × 100; inner volume of tire is 24 liters

TABLE 3

|  | Example 13 | Comparative Example 5 | Example 14 | Example 15 | Comparative Example 6 | Example 16 | Example 17 | Example 18 |
| --- | --- | --- | --- | --- | --- | --- | --- | --- |
| Kind of resin or composition constituting continuous phase of composite body | 10 | 10 | 10 | 10 | 10 | 11 | 12 | 12 |
| Use volume (1) of resin or composition constituting continuous phase of composite body | 1.2 | 5.33 | 4.8 | 0.30 | 0.28 | 1.2 | 1.2 | 1.2 |
| Form of cell | closed cell | closed cell | closed cell | closed cell | closed cell | closed cell | closed cell | closed cell |
| Ingredient in cell | butane | butane | butane | butane | butane | butane | butane | butane |
| Kind of heat decomposable foaming agent (*) | — | — | — | — | — | — | — | — |
| Amount of heat decomposable foaming agent used (kg) | — | — | — | — | — | — | — | — |
| Kind of foaming assistant (**) | — | — | — | — | — | — | — | — |

TABLE 3-continued

|  | Example 13 | Comparative Example 5 | Example 14 | Example 15 | Comparative Example 6 | Example 16 | Example 17 | Example 18 |
|---|---|---|---|---|---|---|---|---|
| Amount of foaming assistant used (kg) | — | — | — | — | — | — | — | — |
| Cell content calculated (vol %) (***) | 95.00 | 77.79 | 80.00 | 98.75 | 98.83 | 95.00 | 95.00 | 95.00 |
| Pressure in cell (kPa) | 300 | 300 | 300 | 300 | 300 | 300 | 300 | 200 |
| Presence or absence of innerliner rubber layer | presence | presence | presence | presence | presence | presence | presence | presence |
| Kind of innerliner rubber | A1 | A1 | A1 | A1 | A1 | A1 | A1 | A1 |
| Presence or absence of sidewall reinforcing rubber | absence | absence | absence | absence | absence | absence | absence | absence |
| Initial internal pressure of tire (kPa) | — | — | — | — | — | — | — | — |
| Increase of deflection quantity of tire after the running on drum over 5000 km (%) | 2.12 | 3.5 | 0.9 | 0.5 | 0.5 | 1.6 | 1.6 | 2.1 |
| Runnable distance of tire after being subjected to external injury (km) | 500 no trouble | 80 trouble | 210 trouble | 220 trouble | 175 trouble | 500 no trouble | 500 no trouble | 225 trouble |

(*) ADCA: Vinyhole AC#3 made by Eiwa Kasei Kogyo Co., Ltd.
DPT: Cellular D made by Eiwa Kasei Kogyo Co., Ltd.
TSH: Unihole H made by Eiwa Kasei Kogyo Co., Ltd.
OBSH: Neocelbon P#100 made by Eiwa Kasei Kogyo Co., Ltd.
(**) Foaming assistant UREA: Cellpaste 101W made by Eiwa Kasei Kogyo Co., Ltd.
(***) Cell content: {1-(use volume of resin constituting composite body/inner volume of tire)} × 100; inner volume of tire is 24 liters

TABLE 4

|  | Comparative Example 7 | Example 19 | Example 20 | Example 21 | Example 22 | Example 23 | Example 24 |
|---|---|---|---|---|---|---|---|
| Kind of resin or composition constituting continuous phase of composite body | 12 | 12 | 13 | 14 | 1 | 2 | 3 |
| Use volume (1) of resin or composition constituting continuous phase of composite body | 1.2 | 1.2 | 1.2 | 1.2 | 1.2 | 1.2 | 1.2 |
| Form of cell | closed cell | closed cell | closed cell | closed cell | closed cell | closed cell | closed cell |
| Ingredient in cell | butane | butane | cyclopentane | butane | butane | butane | cyclopropane |
| Kind of heat decomposable foaming agent (*) | — | — | — | — | — | — | — |
| Amount of heat decomposable foaming agent used (kg) | — | — | — | — | — | — | — |
| Kind of foaming assistant (**) | — | — | — | — | — | — | — |
| Amount of foaming assistant used (kg) | — | — | — | — | — | — | — |
| Cell content calculated (vol %) (***) | 95.00 | 95.00 | 95.00 | 95.00 | 95.00 | 95.00 | 95.00 |
| Pressure in cell (kPa) | 140 | 150 | 300 | 300 | 300 | 300 | 300 |
| Presence or absence of innerliner rubber layer | presence | presence | presence | presence | absence | absence | absence |
| Kind of innerliner rubber | A1 | A1 | A1 | A1 | — | — | — |
| Presence or absence of sidewall reinforcing rubber | absence | absence | absence | absence | absence | absence | absence |
| Initial internal pressure of tire (kPa) | 300 | 300 | — | — | — | — | — |
| Increase of deflection quantity of tire after the running on drum over 5000 km (%) | 1.7 | 1.5 | 1.3 | 2.5 | 0.7 | 0.7 | 0.9 |
| Runnable distance of tire after being subjected to external injury (km) | 182 trouble | 205 trouble | 500 no trouble | 500 no trouble | 500 no trouble | 500 no trouble | 500 no trouble |

(*) ADCA: Vinyhole AC#3 made by Eiwa Kasei Kogyo Co., Ltd.
DPT: Cellular D made by Eiwa Kasei Kogyo Co., Ltd.
TSH: Unihole H made by Eiwa Kasei Kogyo Co., Ltd.
OBSH: Neocelbon P#100 made by Eiwa Kasei Kogyo Co., Ltd.
(**) Foaming assistant UREA: Cellpaste 101W made by Eiwa Kasei Kogyo Co., Ltd.
(***) Cell content: {1-(use volume of resin constituting composite body/inner volume of tire)} × 100; inner volume of tire is 24 liters

TABLE 5

|  | Example 25 | Example 26 | Example 27 | Example 28 | Example 29 | Example 30 |
|---|---|---|---|---|---|---|
| Kind of resin or composition constituting continuous phase of composite body | 4 | 5 | 6 | 7 | 8 | 9 |
| Use volume (1) of resin or composition constituting continuous phase of composite body | 1.2 | 1.2 | 1.2 | 1.2 | 1.2 | 1.2 |
| Form of cell | closed cell | closed cell | closed cell | closed cell | closed cell | closed cell |
| Ingredient in cell | propane | butane | pentane | butane | butane | nitrogen |

TABLE 5-continued

|  | Example 25 | Example 26 | Example 27 | Example 28 | Example 29 | Example 30 |
|---|---|---|---|---|---|---|
| Kind of heat decomposable foaming agent (*) | — | — | — | — | — | OBSH |
| Amount of heat decomposable foaming agent used (kg) | — | — | — | — | — | 0.72 |
| Kind of foaming assistant (**) | — | — | — | — | — | — |
| Amount of foaming assistant used (kg) | — | — | — | — | — | 0.72 |
| Cell content calculated (vol %) (***) | 95 | 95 | 95 | 95 | 95 | 95 |
| Pressure in cell (kPa) | 300 | 300 | 300 | 300 | 300 | 300 |
| Presence or absence of innerliner rubber layer | absence | absence | absence | absence | absence | absence |
| Kind of innerliner rubber | — | — | — | — | — | — |
| Presence or absence of sidewall reinforcing rubber | absence | absence | absence | absence | absence | absence |
| Initial internal pressure of tire (kPa) | — | — | — | — | — | — |
| Increase of deflection quantity of tire after the running on drum over 5000 km (%) | 0.9 | 1.2 | 1.3 | 1.6 | 1.7 | 1.1 |
| Runnable distance of tire after being subjected to external injury (km) | 500 no trouble | 500 no trouble | 500 no trouble | 500 no trouble | 500 no trouble | 500 no trouble |

(*) ADCA: Vinyhole AC#3 made by Eiwa Kasei Kogyo Co., Ltd.
DPT: Cellular D made by Eiwa Kasei Kogyo Co., Ltd.
TSH: Unihole H made by Eiwa Kasei Kogyo Co., Ltd.
OBSH: Neocelbon P#100 made by Eiwa Kasei Kogyo Co., Ltd.
(**) Foaming assistant UREA: Cellpaste 101W made by Eiwa Kasei Kogyo Co., Ltd.
(***) Cell content: {1-(use volume of resin constituting composite body/inner volume of tire)} × 100; inner volume of tire is 24 liters

TABLE 6

|  | Example 31 | Example 32 | Example 33 | Example 34 | Example 35 | Example 36 | Example 37 |
|---|---|---|---|---|---|---|---|
| Kind of resin or composition constituting continuous phase of composite body | 10 | 11 | 12 | 13 | 14 | 14 | 9 |
| Use volume (1) of resin or composition constituting continuous phase of composite body | 2.0 | 2.0 | 2.0 | 2.0 | 2.0 | 2.0 | 1.2 |
| Form of cell | closed cell | closed cell | closed cell | closed cell | closed cell | closed cell | closed cell |
| Ingredient in cell | butane | butane | butane | cyclopentane | butane | nitrogen | butane |
| Kind of heat decomposable foaming agent (*) | — | — | — | — | — | OBSH | — |
| Amount of heat decomposable foaming agent used (kg) | — | — | — | — | — | 0.72 | — |
| Kind of foaming assistant (**) | — | — | — | — | — | — | — |
| Amount of foaming assistant used (kg) | — | — | — | — | — | — | — |
| Cell content calculated (vol %) (***) | 91.67 | 91.67 | 91.67 | 91.67 | 91.67 | 91.67 | 95 |
| Pressure in cell (kPa) | 300 | 300 | 300 | 300 | 300 | 300 | 300 |
| Presence or absence of innerliner rubber layer | absence | absence | absence | absence | absence | presence | presence |
| Kind of innerliner rubber | — | — | — | — | — | B1 | B1 |
| Presence or absence of sidewall reinforcing rubber | absence | absence | absence | absence | absence | absence | absence |
| Initial internal pressure of tire (kPa) | — | — | — | — | — | — | — |
| Increase of deflection quantity of tire after the running on drum over 5000 km (%) | 10.2 | 15.2 | 15.6 | 12.3 | 19.6 | 0.2 | 0.3 |
| Runnable distance of tire after being subjected to external injury (km) | 380 trouble | 280 trouble | 240 trouble | 330 trouble | 210 trouble | 500 no trouble | 500 no trouble |

(*) ADCA: Vinyhole AC#3 made by Eiwa Kasei Kogyo Co., Ltd.
DPT: Cellular D made by Eiwa Kasei Kogyo Co., Ltd.
TSH: Unihole H made by Eiwa Kasei Kogyo Co., Ltd.
OBSH: Neocelbon P#100 made by Eiwa Kasei Kogyo Co., Ltd.
(**) Foaming assistant UREA: Cellpaste 101W made by Eiwa Kasei Kogyo Co., Ltd.
(***) Cell content: {1-(use volume of resin constituting composite body/inner volume of tire)} × 100; inner volume of tire is 24 liters

TABLE 7

| No. | Compound | Supplier | Trade name | Ingredient contained in cell |
|---|---|---|---|---|
| 1 | polyvinyl alcohol | — | trial piece | — |
| 2 | methyl methacrylate/acrylonitrile copolymer | — | trial piece | propane |
| 3 | methyl methacrylate/acrylonitrile/methacrylonitrile terpolymer | — | trial piece | propane |
| 4 | vinylidene chloride/acrylonitrile copolymer | — | trial piece | propane |
| 5 | methyl methacrylate/acrylonitrile copolymer | Aquzo Novel Co., Ltd. | EXPANCEL 053 | isobutane |
| 6 | methyl methacrylate/acrylonitrile/methacrylonitrile terpolymer | Aquzo Novel Co., Ltd. | EXPANCEL 091 | isopentane |
| 7 | vinylidene chloride/acrylonitrile copolymer | Aquzo Novel Co., Ltd. | EXPANCEL 461 | isobutane |

TABLE 7-continued

| No. | Compound | Supplier | Trade name | Ingredient contained in cell |
|---|---|---|---|---|
| 8 | methyl methacrylate/styrene copolymer | Mitsubishi Chemical Foam Plastic Co., Ltd. | Clearpole CL300A | butane |
| 9 | polyethylene terephthalate | — | trial piece | — |
| 10 | acrylonitrile/styrene | Mitsubishi Chemical Foam Plastic Co., Ltd. | HP200X | butane |
| 11 | polypropylene | Mitsubishi Chemical Foam Plastic Co., Ltd. | EP pole 4540 | butane |
| 12 | polystyrene/polyethylene copolymer | Mitsubishi Chemical Foam Plastic Co., Ltd. | Elenpole WH-50RX | butane |
| 13 | polyethylene | — | trial piece | cyclopentane |
| 14 | polystyrene | Mitsubishi Chemical Foam Plastic Co., Ltd. | Styropole JF-D | butane |

TABLE 8

| Kind of innerliner rubber composition | A1 | A2 | B1 |
|---|---|---|---|
| Nylon-11 [Rilsan BMN, trade name, (made by Ato-Chem Co., Ltd.)] | — | — | 8 |
| Nylon-6/66 copolymer ① [Aramine CM6001, trade name, (made by Toray Industries, Inc.)] | — | — | 32 |
| Nylon-6/66 copolymer ② [Aramine CM6041, trade name, (made by Toray Industries, Inc.)] | — | — | — |
| Br-IPMS [EXXPR089-4, trade name, made by Exxon Chemical Corp.)] | — | — | 60 |
| HNBR (Zetpol 1020, trade name, (made by Nippon Zeon Co., Ltd.)] | — | — | — |
| ENR [50% Epoxidized Natural Rubber (made in Malaysia)] | — | — | — |
| NR | 25 | — | — |
| Butyl rubber (JIS BUTYL 065) | 75 | 100 | — |
| Carbon black (Seast V, made by Tokai Carbon Co., Ltd.) | 70 | 70 | — |
| Spindle oil | 11 | 11 | — |
| Stearic acid | 0.5 | 0.5 | 0.6 |
| Zinc stearate | — | — | 1.2 |
| MAGUNESIUM OXIDE (made by Kamishima Kagaku Kogyo Co., Ltd.) | 1.0 | 1.0 | — |
| Accelerator DM (ACCEL DM, made by Kawaguchi Kagaku Kogyo Co., Ltd.) | 1.0 | 1.0 | — |
| Cumarone indene resin (Cumarone NG, made by Mitsubishi Chemical Corp.) | 10.0 | 10.0 | — |
| Zinc white | 0.5 | 0.5 | 0.3 |
| Accelerator M (NOCCELER M, made by Ohuchi Shinko Kagaku Co., Ltd.) | — | — | — |
| Accelerator TT (NOCCELER TT, made by Ohuchi Shinko Kagaku Co., Ltd.) | — | — | — |
| Accelerator DPG (NOCCELER D, D-T, made by Ohuchi Shinko Kagaku Co., Ltd.) | 0.1 | 0.1 | — |
| Powdery sulfur | 1.0 | 1.0 | — |
| Method of charging crosslinking agent | Rubber kneading | Rubber kneading | Rubber kneading |
| Gelation ratio (%) | — | — | 83 |
| Gas permeability constant ($10^{-12}$ cc · cm/cm$^2$ · s · cmHg) | 300 | 200 | 11 |

Measurement of gas permeability constant: according to JIS K7126(1987) (Test method (A method) for gas permeability of plastic film and sheet) by Model MT-C3, made by Toyo Seiki Seisakusho Co., Ltd.

TABLE 9

| Content of sidewall reinforcing rubber composition | |
|---|---|
| Natural rubber | 30.0 parts by weight |
| Butadiene rubber | 70.0 parts by weight |
| Carbon black | 60.0 parts by weight |
| Softening agent (spindle oil) | 3.0 parts by weight |
| Zinc white | 5.0 parts by weight |
| Stearic acid | 1.0 part by weight |
| Antioxidant | 2.0 parts by weight |
| Vulcanization accelerator | 2.5 parts by weight |
| Powdery sulfur | 6.0 parts by weight |

Conventional Example

Then, a tire shown in JP-A-48-47002 is prepared according to the description of this publication.

That is, when a lot of starting materials for the formation of many closed cell bodies is placed in an inside of a tire-rim assembly and built-up through vulcanization, blown phenomenon is caused because a pressure produced by expanding the starting material for the formation of closed cell bodies at a heating step is small. Such a blown phenomenon is a general inconvenience observed at a vulcanization step of a rubber article caused by formation of a cell due to volatile ingredient in the starting material and mainly results from a lacking of pressure. Moreover, in the inside of the expanded pressure cellular body covered with a soft elastic outer coating, the presence or absence of the occurrence of the blown phenomenon can not be confirmed because the starting material for the formation of the closed cell body is expanded.

Then, the thus obtained composite body filled tire is subjected to a running experiment by an indoor drum testing machine while applying a load and a traction force to the tire. When the inside of the tire is observed after the running over about 100 km, many expanded pressure cellular bodies covered with the soft elastic outer coating are at a separated state. From the surface observation of these bodies, it has been confirmed that the peeling resulted from the cells due to the blown phenomenon is caused on the surfaces of the expanded pressure cellular bodies inside the soft elastic outer coating to arrive at separation.

And also, when the above composite body filled tire is subjected to a running test on a drum over 1000 km, it has been confirmed that all of the expanded pressure cellular bodies covered with the soft elastic outer coating are separated. Furthermore, it has been confirmed that the occurrence of wear is observed by friction of the separated faces from the surface observation of the expanded pressure cellular bodies.

When the rolling resistance is measured with respect to the tire after the running over 1000 km, it has been confirmed that the rolling resistance is largely poor as compared with the usual tire applying the internal pressure by using a tube and the difference to such a tubed tire increases as the running history increases. As cause of these phenomena, there are related two factors of energy loss due to heat generation by friction of separated faces and lowering of internal pressure holding function of the soft elastic outer coating accompanied with the wearing as elucidated by the above observations. From these facts, there can be obtained a conclusion that the serious degradation of the rolling resistance is caused by ① occurrence of blown in the soft elastic outer coating, ② friction breakage of the soft elastic outer coating through the running, ③ lowering of internal pressure holding function through the soft elastic outer coating because of the wearing, ④ scattering of gas from a discharging hole of the rim and ⑤ energy loss due to heat generation by friction of separated faces.

EXAMPLES 38–51

Comparative Examples 8–25

Tires for passenger cars are prepared by applying one of the composite bodies of various specifications shown in Tables 10–12 to a tire having a structure shown in FIGS. 1, 2 or 3, respectively. A tire size is 185/70R14, and a rim size is 5.5J×14. In this case, the tire 1 is made according to a general structure in the respective tire kind and size. Moreover, kind and content of compositions and polymer kind as a continuous phase of a composite body in Tables 10–12 are shown in Tables 13–15, kinds of compositions for the innerliner layer are shown in Tables 13 and 14, and a content of sidewall reinforcing rubber composition is shown in Table 16, respectively.

With respect to each of the thus obtained tires, deflection quantity of the tire is measured before and after the running on a drum over 5000 km under a load of 450 kgf, and a change of deflection quantity before and after the running on the drum (height of the tire before the running under load−height of the tire after the running under load) is represented by an index on the basis that the height of each tire before the running under load is 100. The smaller the index value, the better the property.

Further, the tire after the running on the drum is mounted onto a passenger car of 2000 cc, and subjected to an external injury by passing a nail of 3 mm in diameter and 3 cm in length from an outside of a tire tread through a tread and then run on a test circuit course at 90 km/h under a load corresponding to a total weight of four crewmen over 500 km at maximum, during which a runnable distance of not less than 200 km is determined to be acceptable.

These measured results are also shown in Tables 10–12.

TABLE 10

|  | Comparative Example 8 | Comparative Example 9 | Comparative Example 10 | Comparative Example 11 | Comparative Example 12 | Comparative Example 13 | Comparative Example 14 | Comparative Example 15 | Comparative Example 16 | Comparative Example 17 |
|---|---|---|---|---|---|---|---|---|---|---|
| Kind of resin or composition constituting continuous phase of composite body | — | — | — | — | — | — | — | — | — | — |
| Use volume (1) of resin or composition constituting continuous phase of composite body | — | — | — | — | — | — | — | — | — | — |
| Form of cell | — | — | — | — | — | — | — | — | — | — |
| Ingredient in cell | — | — | — | — | — | — | — | — | — | — |
| Kind of heat decomposable foaming agent (*) | — | — | — | — | — | — | — | — | — | — |
| Amount of heat decomposable foaming agent used (kg) | — | — | — | — | — | — | — | — | — | — |
| Kind of foaming assistant (**) | — | — | — | — | — | — | — | — | — | — |
| Amount of foaming assistant used (kg) | — | — | — | — | — | — | — | — | — | — |
| Cell content calculated (vol %) (***) | — | — | — | — | — | — | — | — | — | — |
| Pressure in cell (kPa) | — | — | — | — | — | — | — | — | — | — |
| Presence or absence of innerliner rubber layer | presence | presence | presence | absence | presence | presence | presence | presence | presence | presence |
| Kind of innerliner rubber | A1 | A1 | A2 | — | B1 | B2 | B3 | B4 | B5 | B6 |
| Presence or absence of sidewall reinforcing rubber | absence | presence | presence | presence | presence | presence | presence | presence | presence | presence |
| Initial internal pressure of tire (kPa) | 320 | 320 | 320 | 320 | 320 | 320 | 320 | 320 | 320 | 320 |
| Increase of deflection quantity of tire after the running on drum over 5000 km (%) | 2.5 | 2.5 | 2.2 | 32.5 | 0.7 | 0.8 | 1.1 | 0.9 | 0.7 | 0.7 |

TABLE 10-continued

|  | Comparative Example 8 | Comparative Example 9 | Comparative Example 10 | Comparative Example 11 | Comparative Example 12 | Comparative Example 13 | Comparative Example 14 | Comparative Example 15 | Comparative Example 16 | Comparative Example 17 |
|---|---|---|---|---|---|---|---|---|---|---|
| Runnable distance of tire after being subjected to external injury (km) | 1.5 tire breakage | 180 trouble | 180 trouble | 165 trouble | 180 trouble | 180 trouble | 180 trouble | 180 trouble | 180 trouble | 180 trouble |

(*) ADCA: Vinyhole AC#3 made by Eiwa Kasei Kogyo Co., Ltd.
DPT: Cellular D made by Eiwa Kasei Kogyo Co., Ltd.
TSH: Unihole H made by Eiwa Kasei Kogyo Co., Ltd.
OBSH: Neocelbon P#100 made by Eiwa Kasei Kogyo Co., Ltd.
(**) Foaming assistant UREA: Cellpaste 101W made by Eiwa Kasei Kogyo Co., Ltd.
(***) Cell content: {1-(use volume of resin constituting composite body/inner volume of tire)} × 100; inner volume of tire is 24 liters

TABLE 11

|  | Comparative Example 18 | Comparative Example 19 | Comparative Example 20 | Comparative Example 21 | Comparative Example 22 | Example 38 | Example 39 | Example 40 | Example 41 | Example 42 | Example 43 |
|---|---|---|---|---|---|---|---|---|---|---|---|
| Kind of resin or composition constituting continuous phase of composite body | A1 | A1 | A1 | A1 | A2 | B1 | B2 | B3 | B4 | B5 | B6 |
| Use volume (1) of resin or composition constituting continuous phase of composite body | 1.2 | 1.2 | 1.2 | 1.2 | 1.2 | 1.2 | 1.2 | 1.2 | 1.2 | 1.2 | 1.2 |
| Form of cell | closed cell | closed cell | closed cell | closed cell | closed cell | closed cell | closed cell | closed cell | closed cell | closed cell | closed cell |
| Ingredient in cell | nitrogen | nitrogen | nitrogen | nitrogen | nitrogen | nitrogen | nitrogen | nitrogen | nitrogen | nitrogen | nitrogen |
| Kind of heat decomposable foaming agent (*) | ADCA | DPT | OBSH | TSH | ADCA | ADCA | DPT | OBSH | TSH | ADCA | ADCA |
| Amount of heat decomposable foaming agent used (kg) | 0.40 | 0.44 | 0.79 | 0.79 | 0.40 | 0.40 | 0.44 | 0.79 | 0.79 | 0.40 | 0.40 |
| Kind of foaming assistant (**) | UREA | UREA | — | — | UREA | UREA | UREA | — | — | UREA | UREA |
| Amount of foaming assistant used (kg) | 0.10 | 0.05 | — | — | 0.10 | 0.10 | 0.05 | — | — | 0.10 | 0.10 |
| Cell content calculated (vol %) (***) | 95.0 | 95.0 | 9.50 | 95.0 | 95.0 | 95.0 | 95.0 | 95.0 | 95.0 | 95.0 | 95.0 |
| Pressure in cell (kPa) | 320 | 320 | 320 | 320 | 320 | 320 | 320 | 320 | 320 | 320 | 320 |
| Presence or absence of innerliner rubber layer | presence | presence | presence | presence | presence | presence | presence | presence | presence | presence | presence |
| Kind of innerliner rubber | A1 | A1 | A1 | A1 | A1 | A1 | A1 | A1 | A1 | A1 | A1 |
| Presence or absence of sidewall reinforcing rubber | absence | absence | absence | absence | absence | absence | absence | absence | absence | absence | absence |
| Initial internal pressure of tire (kPa) | — | — | — | — | — | — | — | — | — | — | — |
| Increase of deflection quantity of tire after the running on drum over 5000 km (%) | 0.6 | 0.6 | 0.6 | 0.6 | 0.1 | 0.2 | 0.2 | 0.2 | 0.2 | 0.1 | 0.1 |
| Runnable distance of tire after being subjected to external injury (km) | 170 trouble | 170 trouble | 175 trouble | 175 trouble | 170 trouble | 250 trouble | 245 trouble | 250 trouble | 250 trouble | 285 trouble | 290 trouble |

(*) ADCA: Vinyhole AC#3 made by Eiwa Kasei Kogyo Co., Ltd.
DPT: Cellular D made by Eiwa Kasei Kogyo Co., Ltd.
TSH: Unihole H made by Eiwa Kasei Kogyo Co., Ltd.
OBSH: Neocelbon P#100 made by Eiwa Kasei Kogyo Co., Ltd.
(**) Foaming assistant UREA: Cellpaste 101W made by Eiwa Kasei Kogyo Co., Ltd.
(***) Cell content: {1-(use volume of resin constituting composite body/inner volume of tire)} × 100; inner volume of tire is 24 liter

TABLE 12

|  | Example 44 | Example 45 | Example 46 | Example 47 | Example 48 | Comparative Example 23 | Example 49 | Example 50 | Comparative Example 24 | Example 51 | Comparative Example 25 |
|---|---|---|---|---|---|---|---|---|---|---|---|
| Kind of resin or composition constituting continuous phase of composite body | NY-1 | NY-2 | NY-3 | NY-4 | NY-5 | NY-1 | NY-1 | NY-1 | NY-1 | B6 | B6 |
| Use volume (1) of resin or composition constituting continuous phase of composite body | 0.8 | 0.8 | 0.8 | 0.8 | 0.8 | 5.34 | 4.80 | 0.3 | 0.25 | 1.2 | 1.2 |

TABLE 12-continued

|  | Example 44 | Example 45 | Example 46 | Example 47 | Example 48 | Comparative Example 23 | Example 49 | Example 50 | Comparative Example 24 | Example 51 | Comparative Example 25 |
|---|---|---|---|---|---|---|---|---|---|---|---|
| Form of cell | closed cell | closed cell | closed cell | closed cell | closed cell | closed cell | closed cell | closed cell | closed cell | closed cell | closed cell |
| Ingredient in cell | nitrogen | nitrogen | nitrogen | nitrogen | nitrogen | nitrogen | nitrogen | nitrogen | nitrogen | nitrogen | nitrogen |
| Kind of heat decomposable foaming agent (*) | ADCA | ADCA | ADCA | ADCA | ADCA | ADCA | ADCA | ADCA | ADCA | ADCA | ADCA |
| Amount of heat decomposable foaming agent used (kg) | 0.40 | 0.40 | 0.40 | 0.40 | 0.40 | 0.35 | 0.36 | 0.40 | 0.40 | 0.22 | 0.20 |
| Kind of foaming assistant (**) | UREA | UREA | UREA | UREA | UREA | UREA | UREA | UREA | UREA | UREA | UREA |
| Amount of foaming assistant used (kg) | 0.10 | 0.10 | 0.10 | 0.10 | 0.10 | 0.10 | 0.10 | 0.10 | 0.10 | 0.10 | 0.10 |
| Cell content calculated (vol %) (***) | 96.67 | 96.67 | 96.67 | 96.67 | 96.67 | 77.75 | 80.00 | 98.75 | 98.96 | 95.0 | 95.0 |
| Pressure in cell (kPa) | 320 | 320 | 320 | 320 | 320 | 320 | 320 | 320 | 320 | 150 | 140 |
| Presence or absence of inner-liner rubber layer | absence | absence | absence | absence | absence | absence | absence | absence | absence | presence | presence |
| Kind of innerliner rubber | — | — | — | — | — | — | — | — | — | A1 | A1 |
| Presence or absence of side-wall reinforcing rubber | absence | absence | absence | absence | absence | absence | absence | absence | absence | absence | absence |
| Initial internal pressure of tire (kPa) | — | — | — | — | — | — | — | — | — | 280 | 280 |
| Increase of deflection quantity of tire after the running on drum over 5000 km (%) | 0.2 | 0.2 | 0.2 | 0.2 | 0.2 | 4.3 | 1.8 | 0.2 | 0.2 | 2.4 | 2.4 |
| Runnable distance of tire after being subjected to external injury (km) | 500 complete run | 500 complete run | 500 complete run | 500 complete run | 500 complete run | 90 trouble | 220 trouble | 240 trouble | 190 trouble | 210 trouble | 190 trouble |

(*) ADCA: Vinyhole AC#3 made by Eiwa Kasei Kogyo Co., Ltd.
DPT: Cellular D made by Eiwa Kasei Kogyo Co., Ltd.
TSH: Unihole H made by Eiwa Kasei Kogyo Co., Ltd.
OBSH: Neocelbon P#100 made by Eiwa Kasei Kogyo Co., Ltd.
(**) Foaming assistant UREA: Ceilpaste 101W made by Eiwa Kasei Kogyo Co., Ltd.
(***) Cell content: {1-(use volume of resin constituting composite body/inner volume of tire)} × 100; inner volume of tire is 24 liter

TABLE 13

| Kind of compositions of composite body and innerliner layer | A1 | A2 | B1 | B2 |
|---|---|---|---|---|
| Nylon-11 [Rilsan BMN, trade name, (made by Ato-Chem Co., Ltd.)] | — | — | 8 | 16 |
| Nylon-6/66 copolymer ① [Aramine CM6001, trade name, (made by Toray Industries, Inc.)] | — | — | 32 | 24 |
| Nylon-6/66 copolymer ② [Aramine CM6041, trade name, (made by Toray Industries, Inc.)] | — | — | — | — |
| Br-IPMS [EXXPR089-4, trade name, (made by Exxon Chemical Corp.)] | — | — | 60 | 60 |
| HNBR (Zetpol 1020, trade name, (made by Nippon Zeon Co., Ltd.)] | — | — | — | — |
| ENR [50% Epoxidized Natural Rubber (made in Malaysia)] | — | — | — | — |
| NR | 25 | — | — | — |
| Butyl rubber (JIS BUTYL 065) | 75 | 100 | — | — |
| Carbon black (Seast V, made by Tokai Carbon Co., Ltd.) | 70 | 70 | — | — |
| Spindle oil | 11 | 11 | — | — |
| Stearic acid | 0.5 | 0.5 | 0.6 | 0.6 |
| Zinc stearate | — | — | 1.2 | 1.2 |
| MAGUNESIUM OXIDE (made by Kamishima Kagaku Kogyo Co., Ltd.) | 1.0 | 1.0 | — | — |
| Accelerator DM (ACCEL DM, made by Kawaguchi Kagaku Kogyo Co., Ltd.) | 1.0 | 1.0 | — | — |
| Cumarone indene resin (Cumarone NG, made by Mitsubishi Chemical Corp.) | 10.0 | 10.0 | — | — |
| Zinc white | 0.5 | 0.5 | 0.3 | 0.3 |
| Accelerator M (NOCCELER M, made by Ohuchi Shinko Kagaku Co., Ltd.) | — | — | — | — |
| Accelerator TT (NOCCELER TT, made by Ohuchi Shinko Kagaku Co., Ltd.) | | | | |

TABLE 13-continued

| Kind of compositions of composite body and innerliner layer | A1 | A2 | B1 | B2 |
|---|---|---|---|---|
| Accelerator DPG (NOCCELER D, D-T, made by Ohuchi Shinko Kagaku Co., Ltd.) | 0.1 | 0.1 | — | — |
| Powdery sulfur | 1.0 | 1.0 | — | — |
| Method of charging crosslinking agent | rubber kneading | rubber kneading | rubber kneading | rubber kneading |
| Gelation ratio (%) | — | — | 83 | 85 |
| Gas permeability constant ($10^{-12}$ cc · cm/cm$^2$ · s · cmHg) | 300 | 200 | 11 | 14 |

Measurement of gas permeability constant: according to JIS K7126(1987)(Test method (A method) for gas permeability of plastic film and sheet) by Model MT-C3, made by Toyo Seiki Seisakusho Co., Ltd.

TABLE 14

| Kind of compositions of composite body and innerliner layer | B3 | B4 | B5 | B6 |
|---|---|---|---|---|
| Nylon-11 [Rilsan BMN, trade name, (made by Ato-Chem Co., Ltd.)] | 32 | 24 | 24 | 24 |
| Nylon-6/66 copolymer ① [Aramine CM6001, trade name, (made by Toray Industries, Inc.)] | 8 | 16 | 11 | 11 |
| Nylon-6/66 copolymer ② [Aramine CM6041, trade name, (made by Toray Industries, Inc.)] | — | — | 5 | 5 |
| Br-IPMS [EXXPR089-4, trade name, (made by Exxon Chemical Corp.)] | 60 | 35 | 35 | 35 |
| HNBR (Zetpol 1020, trade name, (made by Nippon Zeon Co., Ltd.)] | — | 10 | 10 | 10 |
| ENR [50% Epoxidized Natural Rubber (made in Malaysia)] | — | 5 | 5 | 5 |
| NR | — | — | — | — |
| Butyl rubber (JIS BUTYL 065) | — | — | — | — |
| Carbon black (Seast V, made by Tokai Carbon Co., Ltd.) | — | — | — | — |
| Spindle oil | — | — | — | — |
| Stearic acid | 0.6 | 0.12 | 0.12 | 0.12 |
| Zinc stearate | 1.2 | 0.05 | 0.05 | 0.05 |
| MAGUNESIUM OXIDE (made by Kamishima Kagaku Kogyo Co., Ltd.) | — | — | — | — |
| Accelerator DM (ACCEL DM, made by Kawaguchi Kagaku Kogyo Co., Ltd.) | — | — | — | — |
| Cumarone indene resin (Cumarone NG, made by Mitsubishi Chemical Corp.) | — | — | — | — |
| Zinc white | 0.3 | 0.3 | 0.3 | 0.3 |
| Accelerator M (NOCCELER M, made by Ohuchi Shinko Kagaku Co., Ltd.) | — | 0.05 | 0.05 | 0.05 |
| Accelerator TT (NOCCELER TT, made by Ohuchi Shinko Kagaku Co., Ltd.) | — | 0.12 | 0.12 | 0.12 |
| Accelerator DPG (NOCCELER D, D-T, made by Ohuchi Shinko Kagaku Co., Ltd.) | — | — | — | — |
| Powdery sulfur | — | 0.05 | 0.05 | 0.05 |
| Method of charging crosslinking agent | rubber kneading | rubber kneading | rubber kneading | biaxial kneading |
| Gelation ratio (%) | 85 | 75 | 75 | 73 |
| Gas permeability constant ($10^{-12}$ cc · cm/cm$^2$ · s · cmHg) | 18 | 13 | 9 | 8 |

Measurement of gas permeability constant: according to JIS K7126(1987)(Test method (A method) for gas permeability of plastic film and sheet) by Model MT-C3, made by Toyo Seiki Seisakusho Co., Ltd.

TABLE 15

| Kind of resin constituting composite body | |
|---|---|
| NY-1 | Nylon-6 [trade name 1030J (made by Ube Industries, Ltd.)] |
| NY-2 | Nylon-11 [trade name Lirusan BMN (made by Atochem)] |
| NY-3 | Nylon-12 [trade name 3035JU6 (made by Ube Industries, Ltd.)] |
| NY-4 | Nylon-6/66 copolymer [trade name 50533JI2 (made by Ube Industries, Ltd.)] |

TABLE 15-continued

Kind of resin constituting composite body

NY-5  Nylon-6/12 copolymer [trade name 7115U (made by Ube Industries, Ltd.)]

TABLE 16

Content of sidewall reinforcing rubber composition

| | |
|---|---|
| Natural rubber | 30.0 parts by weight |
| Butadiene rubber | 70.0 parts by weight |
| Carbon black | 60.0 parts by weight |
| Softening agent (spindle oil) | 3.0 parts by weight |
| Zinc white | 5.0 parts by weight |
| Stearic acid | 1.0 part by weight |
| Antioxidant | 2.0 parts by weight |
| Vulcanization accelerator | 2.5 parts by weight |
| Powdery sulfur | 6.0 parts by weight |

EXAMPLES 52–85

Comparative Examples 26–63

Tires for passenger cars having a tire size of 225/60R16 are prepared by applying one of the composite bodies of various specifications shown in Tables 17–26 to a tire having a structure shown in FIGS. 1, 2 or 3 and assembling onto a rim having a size of 6.5J×16, respectively. In this case, the tire 1 is made according to a general structure in the respective tire kind and size. Moreover, kinds of resins as a continuous phase of a composite body in Tables 17–26 are shown in Table 27, a compounding content of rubber composition used as an innerliner layer or a continuous phase of the composite body is shown in Table 28, a content of sidewall reinforcing rubber composition is shown in Table 29, and kinds of gas ingredients in the cell are shown in Table 30, and a specification of resin particles sealed with liquefied expanding gas used for expanding a continuous phase matrix in them is shown in Table 31, respectively.

With respect to each of the thus obtained tires, deflection quantity of the tire is measured before and after the running on a drum over 5000 km under a load of 570 kgf, and a change of deflection quantity before and after the running on the drum (height of the tire before the running under load–height of the tire after the running under load) is represented by an index on the basis that the height of each tire before the running under load is 100. The smaller the index value, the better the property.

Further, the tire after the running on the drum is mounted onto a passenger car of 3000 cc, and subjected to an external injury by passing a nail of 3 mm in diameter and 3 cm in length from an outside of a tire tread through a tread and then run on a test circuit course at 90 km/h under a load corresponding to a total weight of four crewmen over 500 km at maximum, during which a runnable distance of not less than 200 km is determined to be acceptable.

These measured results are also shown in Tables 17–26.

TABLE 17

| | Comparative Example 26 | Example 52 | Comparative Example 27 | Example 53 | Comparative Example 28 | Example 54 | Comparative Example 29 | Example 55 |
|---|---|---|---|---|---|---|---|---|
| Kind of resin or composition constituting continuous phase of composite body | No. 1 | No. 1 | No. 2 | No. 2 | No. 3 | No. 3 | No. 4 | No. 4 |
| Use volume (1) of resin or composition constituting continuous phase of composite body | 1.27 | 1.27 | 1.91 | 1.91 | 1.91 | 1.91 | 1.91 | 1.91 |
| Form of cell | closed cell | closed cell | closed cell | closed cell | closed cell | closed cell | closed cell | closed cell |
| Ingredient in cell | I | III | I | III | I | III | I | III |
| Resin particles sealed with liquefied gas in cell (*) | a | c | — | — | — | — | — | — |
| Amount of resin sealed with liquefied gas in cell (1) | 0.65 | 0.65 | — | — | — | — | — | — |
| Cell content calculated (vol %) (**) | 94.97 | 94.97 | 95.00 | 95.00 | 95.00 | 95.00 | 95.00 | 95.00 |
| Pressure in cell (kPa) | 300 | 300 | 300 | 300 | 300 | 300 | 300 | 300 |
| Presence or absence of innerliner rubber layer | presence | presence | presence | presence | presence | presence | presence | presence |
| Kind of innerliner rubber | A1 | A1 | A1 | A1 | A1 | A1 | A1 | A1 |
| Presence or absence of sidewall reinforcing rubber | absence | absence | absence | absence | absence | absence | absence | absence |
| Initial internal pressure of tire (kPa) | — | — | — | — | — | — | — | — |
| Presence or absence of flashing, explosion risk | presence | absence | presence | absence | presence | absence | presence | absence |
| Increase of deflection quantity of tire after the running on drum over 5000 km (%) | 0.2 | 0.2 | 0.3 | 0.2 | 0.3 | 0.2 | 0.3 | 0.2 |
| Runnable distance of tire after being subjected to external injury (km) | 500 no trouble | 500 no trouble | 500 no trouble | 500 no trouble | 500 no trouble | 500 no trouble | 500 no trouble | 500 no trouble |

(*) Use together with resin for continuous phase
(**) Cell content: {1-(use volume of resin constituting composite body/inner volume of tire)} × 100; inner volume of tire is 38.1 liter

TABLE 18

| | Comparative Example 30 | Example 56 | Comparative Example 31 | Example 57 | Comparative Example 32 | Example 58 | Comparative Example 33 | Example 59 | Comparative Example 34 | Example 60 |
|---|---|---|---|---|---|---|---|---|---|---|
| Kind of resin or composition constituting continuous phase of composite body | No. 5 | No. 5 | No. 6 | No. 6 | No. 7 | No. 7 | No. 8 | No. 8 | No. 9 | No. 9 |
| Use volume (1) of resin or composition constituting continuous phase of composite body | 1.27 | 1.27 | 1.27 | 1.27 | 1.27 | 1.27 | 1.27 | 1.27 | 1.27 | 1.27 |
| Form of cell | closed cell | closed cell | closed cell | closed cell | closed cell | closed cell | closed cell | closed cell | closed cell | closed cell |
| Ingredient in cell | I | III | II | IV | II | IV | II | IV | II | IV |
| Resin particles sealed with liquefied gas in cell (*) | a | c | b | d | b | d | b | d | b | d |
| Amount of resin sealed with liquefied gas in cell (1) | 0.65 | 0.65 | 0.75 | 0.75 | 0.75 | 0.75 | 0.75 | 0.75 | 0.75 | 0.75 |
| Cell content calculated (vol %) (**) | 94.97 | 94.97 | 94.71 | 94.71 | 94.71 | 94.71 | 94.71 | 94.71 | 94.71 | 94.71 |
| Pressure in cell (kPa) | 300 | 300 | 300 | 300 | 300 | 300 | 300 | 300 | 300 | 300 |
| Presence or absence of innerliner rubber layer | presence | presence | presence | presence | presence | presence | presence | presence | presence | presence |
| Kind of innerliner rubber | A1 | A1 | A1 | A1 | A1 | A1 | A1 | A1 | A1 | A1 |
| Presence or absence of sidewall reinforcing rubber | absence | absence | absence | absence | absence | absence | absence | absence | absence | absence |
| Initial internal pressure of tire (kPa) | — | — | — | — | — | — | — | — | — | — |
| Presence or absence of flashing, explosion risk | presence | absence | presence | absence | presence | absence | presence | absence | presence | absence |
| Increase of deflection quantity of tire after the running on drum over 5000 km (%) | 0.4 | 0.2 | 0.5 | 0.2 | 0.5 | 0.3 | 0.3 | 0.3 | 0.5 | 0.3 |
| Runnable distance of tire after being subjected to external injury (km) | 500 no trouble | 500 no trouble | 500 no trouble | 500 no trouble | 500 no trouble | 500 no trouble | 500 no trouble | 500 no trouble | 500 no trouble | 500 no trouble |

(*) Use together with resin for continuous phase
(**) Cell content: {1-(use volume of resin constituting composite body/inner volume of tire)} × 100; inner volume of tire is 38.1 liters

TABLE 19

| | Comparative Example 35 | Example 61 | Comparative Example 36 | Example 62 |
|---|---|---|---|---|
| Kind of resin or composition constituting continuous phase of composite body | No. 10 | No. 10 | No. 11 | No. 11 |
| Use volume (1) of resin or composition constituting continuous phase of composite body | 1.91 | 1.91 | 1.27 | 1.27 |
| Form of cell | closed cell | closed cell | closed cell | closed cell |
| Ingredient in cell | I | III | I | III |
| Resin particles sealed with liquefied gas in cell (*) | — | — | a | c |
| Amount of resin sealed with liquefied gas in cell (1) | — | — | 0.65 | 0.65 |
| Cell content calculated (vol %) (**) | 95.00 | 95.00 | 94.97 | 94.97 |
| Pressure in cell (kPa) | 300 | 300 | 300 | 300 |
| Presence or absence of innerliner rubber layer | presence | presence | presence | presence |
| Kind of innerliner rubber | A1 | A1 | A1 | A1 |
| Presence or absence of sidewall reinforcing rubber | absence | absence | absence | absence |
| Initial internal pressure of tire (kPa) | — | — | — | — |
| Presence or absence of flashing, explosion risk | presence | absence | presence | absence |
| Increase of deflection quantity of tire after the running on drum over 5000 km (%) | 0.4 | 0.2 | 0.5 | 0.2 |
| Runnable distance of tire after being subjected to external injury (km) | 500 no trouble | 500 no trouble | 500 no trouble | 500 no trouble |

(*) Use together with resin for continuous phase
(**) Cell content: {1-(use volume of resin constituting composite body/inner volume of tire)} × 100; inner volume of tire is 38.1 liters

TABLE 20

|  | Comparative Example 37 | Example 63 | Comparative Example 38 | Example 64 | Comparative Example 39 | Example 65 | Comparative Example 40 | Example 66 | Comparative Example 41 | Example 67 |
|---|---|---|---|---|---|---|---|---|---|---|
| Kind of resin or composition constituting continuous phase of composite body | No. 12 | No. 12 | No. 13 | No. 13 | No. 14 | No. 14 | No. 15 | No. 15 | No. 16 | No. 16 |
| Use volume (1) of resin or composition constituting continuous phase of composite body | 2.00 | 2.00 | 2.00 | 2.00 | 2.00 | 2.00 | 1.27 | 1.27 | 2.00 | 2.00 |
| Form of cell | closed cell | closed cell | closed cell | closed cell | closed cell | closed cell | closed cell | closed cell | closed cell | closed cell |
| Ingredient in cell | I | IV | I | IV | I | IV | I | IV | I | IV |
| Resin particles sealed with liquefied gas in cell (*) | — | — | — | — | — | — | a | d | — | — |
| Amount of resin sealed with liquefied gas in cell (1) | — | — | — | — | — | — | 0.65 | 0.75 | — | — |
| Cell content calculated (vol %) (**) | 94.76 | 94.76 | 94.76 | 94.76 | 94.76 | 94.76 | 94.97 | 94.71 | 94.76 | 94.76 |
| Pressure in cell (kPa) | 300 | 300 | 300 | 300 | 300 | 300 | 300 | 300 | 300 | 300 |
| Presence or absence of innerliner rubber layer | presence | presence | presence | presence | presence | presence | presence | presence | presence | presence |
| Kind of innerliner rubber | A1 | A1 | A1 | A1 | A1 | A1 | A1 | A1 | A1 | A1 |
| Presence or absence of sidewall reinforcing rubber | absence | absence | absence | absence | absence | absence | absence | absence | absence | absence |
| Initial internal pressure of tire (kPa) | — | — | — | — | — | — | — | — | — | — |
| Presence or absence of flashing, explosion risk | presence | absence | presence | absence | presence | absence | presence | absence | presence | absence |
| Increase of deflection quantity of tire after the running on drum over 5000 km (%) | 2.0 | 1.1 | 1.9 | 0.9 | 2.0 | 0.9 | 1.5 | 0.9 | 2.9 | 1.6 |
| Runnable distance of tire after being subjected to external injury (km) | 500 no trouble | 500 no trouble | 500 no trouble | 500 no trouble | 500 no trouble | 500 no trouble | 500 no trouble | 500 no trouble | 500 no trouble | 500 no trouble |

(*) Use together with resin for continuous phase
(**) Cell content: {1-(use volume of resin constituting composite body/inner volume of tire)} × 100; inner volume of tire is 38.1 liters

TABLE 21

|  | Comparative Example 42 | Comparative Example 43 | Comparative Example 44 | Comparative Example 45 | Comparative Example 46 | Example 68 |
|---|---|---|---|---|---|---|
| Kind of resin or composition constituting continuous phase of composite body | — | — | — | — | No. 1 | No. 1 |
| Use volume (1) of resin or composition constituting continuous phase of composite body | — | — | — | — | 1.27 | 1.27 |
| Form of cell | — | — | — | — | closed cell | closed cell |
| Ingredient in cell | — | — | — | — | I | III |
| Resin particles sealed with liquefied gas in cell (*) | — | — | — | — | a | c |
| Amount of resin sealed with liquefied gas in cell (1) | — | — | — | — | 0.65 | 0.65 |
| Cell content calculated (vol %) (**) | — | — | — | — | 94.97 | 94.97 |
| Pressure in cell (kPa) | — | — | — | — | 300 | 300 |
| Presence or absence of innerliner rubber layer | presence | presence | presence | absence | absence | absence |
| Kind of innerliner rubber | A1 | A1 | A2 | — | — | — |
| Presence or absence of sidewall reinforcing rubber | absence | presence | presence | presence | absence | absence |
| Initial internal pressure of tire (kPa) | 300: air | 300: air | 300: air | 300: air | — | — |
| Presence or absence of flashing, explosion risk | absence | absence | absence | absence | presence | absence |
| Increase of deflection quantity of tire after the running on drum over 5000 km (%) | 2.8 | 2.7 | 2.5 | 38.5 | 0.8 | 0.3 |
| Runnable distance of tire after being subjected to external injury (km) | 1.2 tire breakage | 205 trouble | 200 trouble | 200 trouble | 500 no trouble | 500 no trouble |

(*) Use together with resin for continuous phase
(**) Cell content: {1-(use volume of resin constituting composite body/inner volume of tire)} × 100; inner volume of tire is 38.1 liters

TABLE 22

|  | Comparative Example 47 | Example 69 | Comparative Example 48 | Example 70 | Comparative Example 49 | Example 71 |
|---|---|---|---|---|---|---|
| Kind of resin or composition constituting continuous phase of composite body | No. 2 | No. 2 | No. 3 | No. 3 | No. 4 | No. 4 |
| Use volume (1) of resin or composition constituting continuous phase of composite body | 2.0 | 2.0 | 2.0 | 2.0 | 2.0 | 2.0 |
| Form of cell | closed cell | closed cell | closed cell | closed cell | closed cell | closed cell |
| Ingredient in cell | I | III | I | III | I | III |
| Resin particles sealed with liquefied gas in cell (*) | — | — | — | — | — | — |
| Amount of resin sealed with liquefied gas in cell (1) | — | — | — | — | — | — |
| Cell content calculated (vol %) (**) | 94.76 | 94.76 | 94.76 | 94.76 | 94.76 | 94.76 |
| Pressure in cell (kPa) | 300 | 300 | 300 | 300 | 300 | 300 |
| Presence or absence of innerliner rubber layer | absence | absence | absence | absence | absence | absence |
| Kind of innerliner rubber | — | — | — | — | — | — |
| Presence or absence of sidewall reinforcing rubber | absence | absence | absence | absence | absence | absence |
| Initial internal pressure of tire (kPa) | — | — | — | — | — | — |
| Presence or absence of flashing, explosion risk | presence | absence | presence | absence | presence | absence |
| Increase of deflection quantity of tire after the running on drum over 5000 km (%) | 0.9 | 0.3 | 1.1 | 0.3 | 1.5 | 0.3 |
| Runnable distance of tire after being subjected to external injury (km) | 500 no trouble | 500 no trouble | 500 no trouble | 500 no trouble | 500 no trouble | 500 no trouble |

(*) Use together with resin for continuous phase
(**) Cell content: {1−(use volume of resin constituting composite body/inner volume of tire)} × 100; inner volume of tire is 38.1 liters

TABLE 23

|  | Comparative Example 50 | Example 72 | Comparative Example 51 | Example 73 | Comparative Example 52 | Example 74 | Comparative Example 53 | Example 75 |
|---|---|---|---|---|---|---|---|---|
| Kind of resin or composition constituting continuous phase of composite body | No. 5 | No. 5 | No. 8 | No. 8 | No. 10 | No. 10 | No. 11 | No. 11 |
| Use volume (1) of resin or composition constituting continuous phase of composite body | 1.27 | 1.27 | 1.27 | 1.27 | 2.0 | 2.0 | 1.27 | 1.27 |
| Form of cell | closed cell | closed cell | closed cell | closed cell | closed cell | closed cell | closed cell | closed cell |
| Ingredient in cell | I | III | II | IV | I | III | I | III |
| Resin particles sealed with liquefied gas in cell (*) | a | c | b | d | — | — | a | c |
| Amount of resin sealed with liquefied gas in cell (1) | 0.65 | 0.65 | 0.75 | 0.75 | — | — | 0.65 | 0.65 |
| Cell content calculated (vol %) (**) | 94.97 | 94.97 | 94.71 | 94.71 | 94.76 | 94.76 | 94.97 | 94.97 |
| Pressure in cell (kPa) | 300 | 300 | 300 | 300 | 300 | 300 | 300 | 300 |
| Presence or absence of innerliner rubber layer | absence | absence | absence | absence | absence | absence | absence | absence |
| Kind of innerliner rubber | — | — | — | — | — | — | — | — |
| Presence or absence of sidewall reinforcing rubber | absence | absence | absence | absence | absence | absence | absence | absence |
| Initial internal pressure of tire (kPa) | — | — | — | — | — | — | — | — |
| Presence or absence of flashing, explosion risk | presence | absence | presence | absence | presence | absence | presence | absence |
| Increase of deflection quantity of tire after the running on drum over 5000 km (%) | 0.9 | 0.4 | 0.9 | 0.4 | 1.7 | 0.7 | 1.0 | 0.4 |
| Runnable distance of tire after being subjected to external injury (km) | 500 no trouble | 500 no trouble | 500 no trouble | 500 no trouble | 500 no trouble | 500 no trouble | 500 no trouble | 500 no trouble |

(*) Use together with resin for continuous phase
(**) Cell content: {1−(use volume of resin constituting composite body/inner volume of tire)} × 100; inner volume of tire is 38.1 liters

TABLE 24

|  | Comparative Example 54 | Example 76 | Comparative Example 55 | Example 77 | Comparative Example 56 | Example 78 | Comparative Example 57 | Example 79 | Comparative Example 58 | Example 80 |
|---|---|---|---|---|---|---|---|---|---|---|
| Kind of resin or composition constituting continuous phase of composite body | No. 12 | No. 12 | No. 13 | No. 13 | No. 14 | No. 14 | No. 15 | No. 15 | No. 16 | No. 16 |
| Use volume (1) of resin or composition constituting continuous phase of composite body | 2.0 | 2.0 | 2.0 | 2.0 | 2.0 | 2.0 | 1.27 | 1.27 | 2.0 | 2.0 |
| Form of cell | closed cell | closed cell | closed cell | closed cell | closed cell | closed cell | closed cell | closed cell | closed cell | closed cell |
| Ingredient in cell | I | IV | I | IV | I | IV | I | IV | I | IV |
| Resin particles sealed with liquefied gas in cell (*) | — | — | — | — | — | — | a | d | — | — |
| Amount of resin sealed with liquefied gas in cell (1) | — | — | — | — | — | — | 0.65 | 0.75 | — | — |
| Cell content calculated (vol %) (**) | 94.76 | 94.76 | 94.76 | 94.76 | 94.76 | 94.76 | 94.97 | 94.71 | 94.76 | 94.76 |
| Pressure in cell (kPa) | 300 | 300 | 300 | 300 | 300 | 300 | 300 | 300 | 300 | 300 |
| Presence or absence of innerliner rubber layer | absence | absence | absence | absence | absence | absence | absence | absence | absence | absence |
| Kind of innerliner rubber | — | — | — | — | — | — | — | — | — | — |
| Presence or absence of sidewall reinforcing rubber | absence | absence | absence | absence | absence | absence | absence | absence | absence | absence |
| Initial internal pressure of tire (kPa) | — | — | — | — | — | — | — | — | — | — |
| Presence or absence of flashing, explosion risk | presence | absence | presence | absence | presence | absence | presence | absence | presence | absence |
| Increase of deflection quantity of tire after the running on drum over 5000 km (%) | 11.0 | 7.0 | 15.8 | 9.5 | 16.5 | 10.5 | 13.0 | 7.5 | 22.5 | 16.2 |
| Runnable distance of tire after being subjected to external injury (km) | 305 trouble | 430 trouble | 220 trouble | 330 trouble | 205 trouble | 315 trouble | 250 trouble | 400 trouble | 170 trouble | 215 trouble |

(*) Use together with resin for continuous phase
(**) Cell content: {1-(use volume of resin constituting composite body/inner volume of tire)} × 100; inner volume of tire is 38.1 liters

TABLE 25

|  | Comparative Example 59 | Example 81 | Example 82 | Comparative Example 60 | Example 83 | Comparative Example 61 |
|---|---|---|---|---|---|---|
| Kind of resin or composition constituting continuous phase of composite body | No. 12 | No. 12 | No. 12 | No. 12 | No. 14 | No. 14 |
| Use volume (1) of resin or composition constituting continuous phase of composite body | 8.5 | 7.64 | 0.477 | 0.450 | 2.0 | 2.0 |
| Form of cell | closed cell | closed cell | closed cell | closed cell | closed cell | closed cell |
| Ingredient in cell | III | III | III | III | IV | IV |
| Resin particles sealed with liquefied gas in cell (*) | — | — | — | — | — | — |
| Amount of resin sealed with liquefied gas in cell (1) | — | — | — | — | — | — |
| Cell content calculated (vol%) (**) | 77.74 | 80.00 | 98.75 | 98.82 | 94.76 | 94.76 |
| Pressure in cell (kPa) | 300 | 300 | 300 | 300 | 150 | 140 |
| Presence or absence of innerliner rubber layer | absence | absence | absence | absence | presence | presence |
| Kind of innerliner rubber | — | — | — | — | A2 | A2 |
| Presence or absence of sidewall reinforcing rubber | absence | absence | absence | absence | absence | absence |
| Initial internal pressure of tire (kPa) | — | — | — | — | 300 | 300 |
| Presence or absence of flashing, explosion risk | absence | absence | absence | absence | absence | absence |
| Increase of deflection quantity of tire after the running on drum over 5000 km (%) | 17.0 | 16.5 | 15.3 | 22.4 | 2.6 | 2.6 |
| Runnable distance of tire after being subjected to external injury (km) | 190 trouble | 210 trouble | 220 trouble | 170 trouble | 205 trouble | 175 trouble |

(*) Use together with resin for continuous phase
(**) Cell content: {1-(use volume of resin constituting composite body/inner volume of tire)} × 100; inner volume of tire is 38.1 liters

TABLE 26

| | Comparative Example 62 | Example 84 | Comparative Example 63 | Example 85 |
|---|---|---|---|---|
| Kind of resin or composition constituting continuous phase of composite body | B1 | B1 | B2 | B2 |
| Use volume (1) of resin or composition constituting continuous phase of composite body | 1.49 | 1.49 | 1.49 | 1.49 |
| Form of cell | closed cell | closed cell | closed cell | closed cell |
| Ingredient in cell | I | III | I | III |
| Resin particles sealed with liquefied gas in cell (*) | a | c | a | c |
| Amount of resin sealed with liquefied gas in cell (1) | 0.74 | 0.74 | 0.74 | 0.74 |
| Cell content calculated (vol%) (**) | 94.16 | 94.16 | 94.16 | 94.16 |
| Pressure in cell (kPa) | 250 | 250 | 250 | 250 |
| Presence or absence of innerliner rubber layer | presence | presence | presence | presence |
| Kind of innerliner rubber | A1 | A1 | A1 | A1 |
| Presence or absence of sidewall reinforcing rubber | absence | absence | absence | absence |
| Initial internal pressure of tire (kPa) | — | — | — | — |
| Presence or absence of flashing, explosion risk | presence | absence | presence | absence |
| Increase of deflection quantity of tire after the running on drum over 5000 km (%) | 0.3 | 0.2 | 0.3 | 0.2 |
| Runnable distance of tire after being subjected to external injury (km) | 235 trouble | 260 trouble | 210 trouble | 240 trouble |

(*) Use together with resin for continuous phase
(**) Cell content: {1-(use volume of resin constituting composite body/inner volume of tire)}×100; inner volume of tire is 38.1 liters

TABLE 27

| No. | Kind of composition for continuous phase of composite body | Expansion means | Content of liquefied gas |
|---|---|---|---|
| 1 | polyvinyl alcohol | addition of hollow resin particles sealed with liquefied gas in the filling in tire | — |
| 2 | methyl methacrylate/acrylonitrile copolymer | hollow resin particles sealed with liquefied gas using continuous phase as an outer shell | 10 mass % |
| 3 | methyl methacrylate/acrylonitrile/methacrylonitrile terpolymer | hollow resin particles sealed with liquefied gas using continuous phase as an outer shell | 10 mass % |
| 4 | vinyliden chloride/acrylonitrile copolymer | hollow resin particles sealed with liquefied gas using continuous phase as an outer shell | 10 mass % |
| 5 | nylon-6 | addition of hollow resin particles sealed with liquefied gas in the filling in tire | — |
| 6 | nylon-11 | addition of hollow resin particles sealed with liquefied gas in the filling in tire | — |
| 7 | nylon-12 | addition of hollow resin particles sealed with liquefied gas in the filling in tire | — |
| 8 | nylon-6/12 copolymer | addition of hollow resin particles sealed with liquefied gas in the filling in tire | — |
| 9 | nylon-6/66 copolymer | addition of hollow resin particles sealed with liquefied gas in the filling in tire | — |
| 10 | methyl methacrylate/styrene copolymer | resin body impregnated with gas ingredient | 10 mass % |
| 11 | polyethylene terephthalate | addition of hollow resin particles sealed with liquefied gas in the filling in tire | — |
| 12 | acrylonitrile/styrene | resin body impregnated with gas ingredient | 10 mass % |
| 13 | polypropylene | resin body impregnated with gas ingredient | 10 mass % |
| 14 | polystyrene/polyethylene copolymer | resin body impregnated with gas ingredient | 10 mass % |
| 15 | polyethylene | addition of hollow resin particles sealed with liquefied gas in the filling in tire | — |
| 16 | polystyrene | resin body impregnated with gas ingredient | 10 mass % |

TABLE 28

| Kind of compositions of composite body and innerliner layer | A1 | A2 | A3 | B1 | B2 |
|---|---|---|---|---|---|
| Nylon-11 [Rilsan BMN, trade name, (made by Ato-Chem Co., Ltd.)] | — | — | — | 8 | 16 |
| Nylon-6/66 copolymer ① [Aramine CM6001, trade name, (made by Toray Industries, Inc.)] | — | — | — | 32 | 24 |
| Nylon-6/66 copolymer ② [Aramine CM6041, trade name, (made by Toray Industries, Inc.)] | — | — | — | — | — |
| Br-IPMS [EXXPRO89-4, trade name, (made by Exxon Chemical Corp.)] | — | — | — | 60 | 60 |
| HNBR [Zetpol 1020, trade name, (made by Nippon Zeon Co., Ltd.)] | — | — | — | — | — |
| ENR [50% Epoxidized Natural Rubber (made in Malaysia)] | — | — | — | — | — |
| NR | 25 | — | 75 | — | — |
| BR | — | — | 25 | — | — |
| Butyl rubber (JIS BUTYL 065) | 75 | 100 | — | — | — |
| Carbon black (Seast V, made by Tokai Carbon Co., Ltd.) | 70 | 70 | 40 | — | — |
| Spindle oil | 11 | 11 | 5 | — | — |
| Stearic acid | 0.5 | 0.5 | 3 | 0.6 | 0.6 |
| Zinc stearate | — | — | — | 1.2 | 1.2 |
| MAGUNESIUM OXIDE (made by Kamishima Kagaku Kogyo Co., Ltd.) | 1.0 | 1.0 | — | — | — |
| Accelerator DM (ACCEL DM, made by Kawaguchi Kagaku Kogyo Co., Ltd.) | 1.0 | 1.0 | 0.5 | — | — |
| Cumarone indene resin (Cumarone NG, made by Mitsubishi Chemical Corp.) | 10.0 | 10.0 | — | — | — |
| Zinc white | 0.5 | 0.5 | 4 | 0.3 | 0.3 |
| Accelerator M (NOCCELER M, made by Ohuchi Shinko Kagaku Co., Ltd.) | — | — | — | — | — |
| Accelerator TT (NOCCELER TT, made by Ohuchi Shinko Kagaku Co., Ltd.) | — | — | — | — | — |
| Accelerator DPG (NOCCELER D, D-T, made by Ohuchi Shinko Kagaku Co., Ltd.) | 0.1 | 0.1 | — | — | — |
| Vulcanized accelerator(NOCCELER NS-F, made by Ohuchi Shinko Kagaku Co., Ltd.) | — | — | 1.0 | — | — |
| Powdery sulfur | 1.0 | 1.0 | 1.5 | — | — |
| Method of charging crosslinking agent | rubber kneading | rubber kneading | rubber kneading | rubber kneading | rubber kneading |
| Gelation ratio (%) | — | — | — | 83 | 85 |
| Gas permeability constant ($10^{-12}$ cc · cm/cm$^2$ · s · cmHg) | 300 | 200 | — | 11 | 14 |

Measurement of gas permeability constant: according JIS K7126(1987) (Test method (A method) for gas permeability of gas permeability film and sheet) by Model MT-C3, made by Toyo Seiki Seisakusho Co., Ltd.

TABLE 29

| Content of sidewall reinforcing rubber composition | |
|---|---|
| Natural rubber | 30.0 parts by weight |
| Butadiene rubber | 70.0 parts by weight |
| Carbon black | 60.0 parts by weight |
| Softening agent (spindle oil) | 3.0 parts by weight |
| Zinc white | 5.0 parts by weight |
| Stearic acid | 1.0 part by weight |
| Antioxidant | 2.0 parts by weight |
| Vulcanization accelerator | 2.5 parts by weight |
| Powdery sulfur | 6.0 parts by weight |

TABLE 30

| No. | Gas ingredient in cell |
|---|---|
| I | isobutane |
| II | isopentane |
| III | octafluoropropane |
| IV | 2H-heptafluoropropane |

TABLE 31

| Resin particle sealing with liquefied expanding gas to be added to continuous phase matrix | | | |
|---|---|---|---|
| Resin particle sealing with liquefied expanding gas | No. of gas ingredient in cell | Content of gas in cell (mass %) | Kind of outer coating resin |
| a | I | 45 | methyl methacrylate/ acrylonitrile copolymer |
| b | II | 45 | vinylidene chloride/ acrylonitrile copolymer |
| c | III | 45 | methyl methacrylate/ acrylonitrile copolymer |
| d | IV | 45 | vinylidene chloride/ acrylonitrile copolymer |

EXAMPLES 86–93

Comparative Examples 64–66

Tires for passenger cars having a tire size of 205/60R16 are prepared by applying one of the composite bodies of various specifications shown in Tables 32 and 33 to a tire having a structure shown in FIG. 1 or 2. In this case, the tire 1 is made according to a general structure in the respective tire kind and size. Moreover, contents of foaming compositions and additives in Tables 32 and 33 are shown in Tables 34 and 35, and rubber kind of an innerliner layer is shown in Table 36, respectively.

With respect to each of internal pressure adjusted tire and composite body filled tires, deflection quantity of the tire is measured before and after the running on a drum over 5000 km under a load of 4.58 kN, and a change of deflection quantity is represented by an index every tire on the basis that the height of each tire before the running under load is 100. The smaller the index value, the higher the internal pressure holding property and the better the result.

Further, the tire-rim assembly after the running on the drum is mounted onto a passenger car of 2000 cc, and subjected to an external injury by passing a nail of 3 mm in diameter and 3 cm in length from an outside of a tire tread through a tread and then run on a test circuit course at 90 km/h under a load corresponding to a total weight of four crewmen over 300 km at maximum, during which a runnable distance of not less than 200 km is determined to be acceptable.

These measured results are also shown in Tables 32 and 33.

TABLE 32

|  | Comparative Example 64 | Comparative Example 65 | Example 86 | Example 87 | Example 88 | Example 89 |
|---|---|---|---|---|---|---|
| Composition of composite body | No. 1 | No. 1 | No. 2 | No. 3 | No. 4 | No. 5 |
| Softening point of composite body (° C.) | 65 | 65 | 82 | 94 | 96 | 112 |
| Use volume (1) of resin constituting continuous phase of composite body | 1.10 | 1.10 | 1.10 | 1.10 | 1.10 | 1.10 |
| Form of cell | closed cell | closed cell | closed cell | closed cell | closed cell | closed cell |
| Breakdown of additives using together with continuous phase resin |  |  |  |  |  |  |
| Kind of foaming agent added | ADCA | ADCA | ADCA | — | — | — |
| Amount of foaming agent added (g) | 260 | 260 | 260 | — | — | — |
| Kind of foaming assistant added | UREA | UREA | UREA | — | — | — |
| Amount of foaming assistant added (g) | 50 | 50 | 50 | — | — | — |
| Amount (1) of resin particles sealed with liquefied gas (**) | — | — | — | — | — | 0.25 |
| Cell content calculated (vol%) (inner volume of tire is 30.4 liters) | 96.38 | 96.38 | 96.38 | 96.38 | 96.38 | 95.56 |
| Presence or absence of innerliner rubber layer | absence | presence | presence | presence | presence | presence |
| Kind of innerliner rubber | — | B2 | B2 | A1 | A2 | A1 |
| Pressure in cell (kPa) | 200 | 200 | 200 | 200 | 200 | 200 |
| Increase (%) of deflection quantity of tire after the running on drum over 5000 km: provided that a deflection quantity under a load of 4.58 kN before the running is 100 | 11.5 | 5.6 | 1.65 | 0.4 | 0.35 | 0.4 |
| State of composite body after the running of composite body on drum over 5000 km | fusion of central portion | fusion of central portion | no trouble | no trouble | no trouble | no trouble |
| Runnable distance of tire when tire after the running on drum over 5000 km is subjected to external injury (km) | 85 | 155 | 210 | 300 | 300 | 300 |
| State of composite body after the running | fusion | fusion | fusion of central portion | no trouble | no trouble | no trouble |

TABLE 33

|  | Example 90 | Example 91 | Example 92 | Example 93 | Comparative Example 66 |
|---|---|---|---|---|---|
| Composition of composite body | No. 6 | No. 7 | No. 8 | No. 9 | No. 10 |
| Softening point of composite body (° C.) | 116 | 135 | 144 | 175 | 195 |
| Use volume (1) of resin constituting continuous phase of composite body | 1.10 | 1.10 | 1.10 | 1.10 | 1.10 |
| Form of cell | closed cell | closed cell | closed cell | closed cell | closed cell |
| Breakdown of additives using together with continuous phase resin |  |  |  |  |  |
| Kind of foaming agent added | — | ADCA | — | ADCA | ADCA |
| Amount of foaming agent added (g) | — | 260 | — | 260 | 260 |
| Kind of foaming assistant added | — | UREA | — | UREA | UREA |
| Amount of foaming assistant added (g) | — | 50 | — | 50 | 50 |
| Amount (1) of resin particles sealed with liquefied gas (**) | — | — | — | — | — |
| Cell content calculated (vol%) (inner volume of tire is 30.4 liters) | 96.38 | 96.38 | 96.38 | 96.38 | 96.38 |
| Presence or absence of innerliner rubber layer | presence | presence | presence | presence | presence |
| Kind of innerliner rubber | A1 | B1 | A1 | A1 | A1 |
| Pressure in cell (kPa) | 200 | 200 | 200 | 200 | 200 |

TABLE 33-continued

|  | Example 90 | Example 91 | Example 92 | Example 93 | Comparative Example 66 |
|---|---|---|---|---|---|
| Increase (%) of deflection quantity of tire after the running on drum over 5000 km: provided that a deflection quantity under a load of 4.58 kN before the running is 100 | 0.20 | 1.8 | 0.05 | 0.4 | — |
| State of composite body after the running of composite body on drum over 5000 km | no trouble | no trouble | no trouble | no trouble | — |
| Runnable distance of tire when tire after the running on drum over 5000 km is subjected to external injury (km) | 300 | 280 | 300 | 300 | — |
| State of composite body after the running | no trouble | fusion partly | no trouble | no trouble | — |

TABLE 34

| Composite body No. | Content of resin as continuous phase | Trade name | Softening point (*) | Expansion means | Kind of main gas | Content of gas ingredient |
|---|---|---|---|---|---|---|
| 1 | low-density polyethylene | — | 65° C. | Addition of ADDA (azodicarbonamide) in the filling in tire | nitrogen | — |
| 2 | nylon-5/12 copolymer | Ubenylon 60331-12 | 82 ° C. | Addition of ADDA (azodicarbonamide) in the filling in tire | nitrogen | — |
| 3 | MNA/AN/MAN | trial piece | 94° C. | Hollow resin particles sealed with liquefied gas | propane | 10% |
| 4 | PVDC/MMA/AN/MAN | trial piece | 96° C. | Hollow resin particles sealed with liquefied gas | propane | 10% |
| 5 | NY-6 | Ubenylon 1020J | 112° C. | Addition of hollow resin particles sealed with liquefied gas in the filling in tire (**) | 2H-heptafluoropropane | — |
| 6 | AM/MAN | Expancel 091-80 | 116° C. | Hollow resin particles sealed with liquefied gas | isobutane | 10% |
| 7 | high-density polyethylene |  | 135° C. | Addition of ADDA (azodicarbonamide) in the filling in tire | nitrogen | — |
| 8 | MNA/NA/MAN | trial piece | 144° C. | Hollow resin particles sealed with liquefied gas | octafluoropropane | 10% |
| 9 | NY-6 | Ubenylon 1011FB | 175° C. | Addition of ADDA (azodicarbonamide) in the filling in tire | nitrogen | — |
| 10 | NY-6 | Ubenylon 1013NB | 195° C. | Addition of ADDA (azodicarbonamide) in the filling in tire | nitrogen | — |

*Softening point is measured according to ASTM D-648
**MNA/AN/MAN (trial piece), softening point: 120° C., kind of main liquefied gas sealed: 2H-heptafluoropropane, content of gas ingredient: 45%

TABLE 35

| Foaming agent | ADCA | Vinyhole AC#3, made by Eiwa Kasei Kogyo Co., Ltd. |
|---|---|---|
| Expansion assistant | UREA | Cellpaste 101, made by Eiwa Kasei Kogyo Co., Ltd. |

TABLE 36

|  | A1 | A2 | B1 | B2 |
|---|---|---|---|---|
| Nylon-11 (Rilsan BMNO, trade name, made by Ato-Chem Co., Ltd.) | — | — | 8 | 24 |
| Nylon-6/66 copolymer ① [Aramine CM6001, trade name, (made by Toray Industries, Inc.)] | — | — | 32 | 11 |
| Nylon-6/66 copolymer ② [Aramine CM6041, trade name, (made by Toray Industries, Inc.)] | — | — | — | 5 |

TABLE 36-continued

|  | A1 | A2 | B1 | B2 |
|---|---|---|---|---|
| Br-IPMS [EXXPR089-4, trade name, (made by Exxon Chemical Corp.)] | — | — | 60 | 35 |
| HNBR (Zetpol 1020, trade name, (made by Nippon Zeon Co., Ltd.)] | — | — | — | 10 |
| ENR [50% Epoxidized Natural Rubber (made in Malaysia)] | — | — | — | 5 |
| NR | 25 | — | — | — |
| BR | — | — | — | — |
| Butyl rubber (JSR BUTYL 065) | 75 | 100 | — | — |
| Carbon black (Seast V, made by Tokai Carbon Co., Ltd.) | 70 | 70 | — | — |
| Spindle oil | 11 | 11 | — | — |
| Stearic acid | 0.5 | 0.5 | 0.6 | 0.12 |
| Zinc stearate | — | — | 1.2 | 0.05 |
| MAGUNESIUM OXIDE (made by Kamishima Kagaku Kogyo Co., Ltd.) | 1.0 | 1.0 | — | — |
| Accelerator DM (ACCEL DM, made by Kawaguchi Kagaku Kogyo Co., Ltd.) | 1.0 | 1.0 | — | — |
| Cumarone indene resin (Cumarone NG, made by Mitsubishi Chemical Corp.) | 10.0 | 10.0 | — | — |
| Zinc white | 0.5 | 0.5 | 0.3 | 0.3 |
| Accelerator M (NOCCELER M, made by Ohuchi Shinko Kagaku Co., Ltd.) | — | — | — | 0.05 |
| Accelerator TT (NOCCELER TT, made by Ohuchi Shinko Kagaku Co., Ltd.) | — | — | — | 0.12 |
| Accelerator DPG (NOCCELER D, D-T, made by Ohuchi Shinko Kagaku Co., Ltd.) | 0.1 | 0.1 | — | — |
| Vulcanized accelerator (NOCCELER NS-F, made by Ohuchi Shinko Kagaku Co., Ltd.) | — | — | — | — |
| Powdery sulfur | 1.0 | 1.0 | — | 0.05 |
| Method of charging crosslinking agent | rubber kneading | rubber kneading | biaxial kneading | biaxial kneading |
| Gelation ratio (%) | — | — | 83 | 73 |
| Gas permeability constant ($10^{-12}$ cc. cm/cm$^2$. s. cmHg) | 300 | 200 | 11 | 8 |

Measurement of gas permeability constant: according to JIS K7126(1987)(Test method (A method) for gas permeability of plastic film and sheet) by Model MT-C3, made by Toyo Seiki Seisakusho Co., Ltd.

Incidentally, in Comparative Example 66, a foaming composition for a continuous phase having a softening point of 195° C. is filled, so that it is required to apply a temperature of not lower than 200° C. for the expansion. For this end, the heat-aging of the tire itself is promoted and the durability of the tire is considerably degraded though the tire filled with the composite body is obtained, and hence various tests can not be carried out.

EXAMPLES 94–106

Comparative Examples 67–69

Tires for passenger cars having a tire size of 205/60R15 are prepared by applying one of the composite bodies of various specifications shown in Tables 37 and 38 to a tire having a structure shown in FIG. 1 and assembling it onto a rim having a size of 6.0J×15. In this case, the tire 1 is made according to a general structure in the respective tire kind and size. Moreover, kinds of resins for continuous phase of composite body in Tables 37 and 38 are shown in Table 39, rubber kind of an innerliner layer is shown in Table 40, and content of sidewall reinforcing rubber composition is shown in Table 41, respectively.

With respect to each of the thus obtained tires, deflection quantity of the tire is measured before and after the running on a drum over 5000 km under a load of 4.58 kN, and a change of deflection quantity is represented by an index every tire on the basis that the height of each tire before the running under load is set to 100. The smaller the index value, the better the result.

Further, the tire after the running on the drum is mounted onto a passenger car of 2000 cc, and subjected to an external injury by passing a nail of 3 mm in diameter and 3 cm in length from an outside of a tire tread through a tread and then run on a test circuit course at 90 km/h under a load corresponding to a total weight of four crewmen over 500 km at maximum, during which a runnable distance of not less than 200 km is determined to be acceptable.

And also, a changing ratio of internal pressure when the tire after the running on the drum is left to stand for 1 month of every tire is measured. The smaller the changing ratio of internal pressure, the better the result.

These measured results are also shown in Tables 37 and 38.

TABLE 37

| | Comparative Example 67 | Example 94 | Example 95 | Example 96 | Example 97 | Example 98 | Comparative Example 68 | Example 99 | Example 100 |
|---|---|---|---|---|---|---|---|---|---|
| Kind of resin or composition constituting continuous phase of composite body | — | No. 1 | No. 2 | No. 3 | No. 4 | No. 5/No. 1 | No. 6 | No. 4 | No. 1 |
| Use volume (1) of resin or composition constituting continuous phase of composite body | — | 1.52 | 1.52 | 1.52 | 1.52 | 0.51/1.01 | 1.52 | 1.52 | 1.52 |
| Form of cell | — | closed cell | closed cell | closed cell | closed cell | closed cell | closed cell | closed cell | closed cell |
| Ingredient in cell | — | propane | nitrogen | propane | isobutane | isopentane/propane | isobutane | isobutane | propane |
| Kind of heat decomposable foaming agent (*) | — | — | ADCA | — | — | — | — | — | — |
| Amount of heat decomposable foaming agent used (kg) | — | — | 0.50 | — | — | — | — | — | — |
| Kind of foaming assistant | — | — | urea | — | — | — | — | — | — |
| Amount of foaming assistant used (kg) | — | — | 0.10 | — | — | — | — | — | — |
| Cell content calculated (vol %) (**) (inner volume of tire is 30.4 liters) | — | 95.00 | 95.00 | 95.00 | 95.00 | 95.00 | 95.00 | 95.00 | 95.00 |
| Pressure in cell (kPa) | — | 300 | 300 | 300 | 200 | 200 | 200 | 200 | 200 |
| Presence or absence of innerliner rubber layer | presence | presence | presence | presence | presence | presence | presence | presence | presence |
| Kind of innerliner rubber | A1 | A1 | A1 | A1 | A1 | A1 | A1 | A1 | A1 |
| Initial internal pressure of tire (kPa) | 300 | — | — | — | — | — | — | — | — |
| Increase of deflection quantity of tire after the running on drum over 5000 km (%) | 2.5 | 0.4 | 0.4 | 1.2 | 1.0 | — | 1.2 | 1.0 | 0.8 |
| Runnable distance of tire after being subjected to external injury (km) | 1.5 tire breakage | 500 no trouble | 500 no trouble | 230 trouble | 245 trouble | 260 trouble | 215 trouble | 245 trouble | 290 trouble |

(*) ADCA: Vinyhole AC#3 made by Eiwa Kasei Kogyo Co., Ltd.
TSH: Unihole H made by Eiwa Kasei Kogyo Co., Ltd.
(**) Cell content: {1−(use volume of resin constituting composite body/inner volume of tire)} × 100; inner volume of tire is 30.4 liters

TABLE 38

| | Example 161 | Comparative Example 69 | Comparative Example 70 | Example 102 | Example 103 | Example 104 | Example 105 | Example 106 |
|---|---|---|---|---|---|---|---|---|
| Kind of resin or composition constituting continuous phase of composite body | No. 6 | No. 1 | No. 1 | No. 1 | No. 7 | No. 8 | No. 9/No. 1 | No. 10 |
| Use volume (1) of resin or composition constituting continuous phase of composite body | 6.08 | 6.6 | 0.36 | 0.38 | 1.52 | 0.51/1.01 | 1.52 | 1.52 |
| Form of cell | closed cell | closed cell | closed cell | closed cell | closed cell | closed cell | closed cell | closed cell |
| Ingredient in cell | isobutane | propane | propane | propane | fluoroethane | 2H-heptafluoroethane | cyclopentane/propane | nitrogen |
| Kind of heat decomposable foaming agent (*) | — | — | — | — | — | — | — | TSH |
| Amount of heat decomposable foaming agent used (kg) | — | — | — | — | — | — | — | 0.77 |
| Kind of foaming assistant | — | — | — | — | — | — | — | — |
| Amount of foaming assistant used (kg) | — | — | — | — | — | — | — | — |
| Cell content calculated (vol %) (**) (inner volume of tire is 30.4 liters) | 80.00 | 78.29 | 98.81 | 98.75 | 95.00 | 95.00 | 95.00 | 95.00 |
| Pressure in cell (kPa) | 150 | 150 | 150 | 150 | 300 | 300 | 300 | 300 |
| Presence or absence of innerliner rubber layer | presence | presence | presence | presence | presence | presence | presence | presence |
| Kind of innerliner rubber | A1 | A2 | A2 | A2 | B1 | B1 | B1 | B1 |
| Initial internal pressure of tire (kPa) | 300 | 300 | 300 | 300 | — | — | — | — |
| Increase of deflection quantity of tire after the running on drum over 5000 km (%) | 1.0 | 1.4 | 0.1 | 0.4 | 0.4 | 0.4 | 0.6 | 0.4 |
| Runnable distance of tire after being subjected to external injury (km) | 230 trouble | 185 trouble | 190 trouble | 215 trouble | 500 no trouble | 500 no trouble | 285 trouble | 500 no trouble |

(*) ADCA: Vinyhole AC#3 made by Eiwa Kasei Kogyo Co., Ltd.
TSH: Unihole H made by Eiwa Kasei Kogyo Co., Ltd.
(**) Cell content: {1−(use volume of resin constituting composite body/inner volume of tire)} × 100; inner volume of tire is 30.4 liters

TABLE 39

| No. | Compound | Trade name | Ingredient contained in cell | Content of acrylnitrole ingredient (wt %) | Glass transition temperature (° C.) |
|---|---|---|---|---|---|
| 1 | acrylonitrile/methyl methacrylate copolymer | trial piece | propane | 98 | 104 |
| 2 | acrylonitrile/methacrylonitrile/mehyl methacrylate terpolymer | trial piece | ADCA (*1) urea | 55 | 100 |
| 3 | acrylonitrile/vinylidene chloride copolymer | trial piece | propane | 30 | 23 |
| 4 | acrylonitrile/methyl methacrylate copolymer | EXPANCEL 053: Aquzo Novel Co., Ltd. | isobutane | 40 | 100 |
| 5 | acrylonitrile/methacrylonitrile/methl methacrylate terpolymer | EXPANCEL 091: Aquzo Novel Co., Ltd. | isopentane | 25 | 100 |
| 6 | acrylonitrile/vinylidene chloride copolymer | trial piece | isobutane | 10 | 42 |
| 7 | acrylonitrile/methacrylonitrile/mehyl methacrylate terpolymer | trial piece | fluoroethane | 55 | 100 |
| 8 | acrylonitrile/methacrylonitrile/mehyl methacrylate terpolymer | trial piece | 2H-heptafluoropropane | 55 | 100 |
| 9 | acrylonitrile/methacrylonitrile/mehyl methacrylate terpolymer | trial piece | cyclopentane | 55 | 100 |
| 10 | acrylonitrile/methacrylonitrile/mehyl methacrylate terpolymer | trial piece | p-toluenesulfonyl hydrazine | 55 | 100 |

(*) ADCA: azodicarbonamide

TABLE 40

| Kind of innerliner rubber composition | A1 | A2 | B1 |
|---|---|---|---|
| Nylon-11 [Rilsan BMN, trade name, (made by Ato-Chem Co., Ltd.)] | — | — | 8 |
| Nylon-6/66 copolymer ① [Aramine CM6001, trade name, (made by Toray Industries, Inc.)] | — | — | 32 |
| Nylon-6/66 copolymer ② [Aramine CM6041, trade name, (made by Toray Industries, Inc.)] | — | — | — |
| Br-IPMS [EXXPR089-4, trade name, (made by Exxon Chemical Corp.)] | — | — | 60 |
| HNBR (Zetpol 1020, trade name, (made by Nippon Zeon Co., Ltd.)] | — | — | — |
| ENR [50% Epoxidized Natural Rubber (made in Malaysia)] | — | — | — |
| NR | 25 | — | — |
| Butyl rubber (JIS BUTYL 065) | 75 | 100 | — |
| Carbon black (Seast V. made by Tokai Carbon Co., Ltd.) | 70 | 70 | — |
| Spindle oil | 11 | 11 | — |
| Stearic acid | 0.5 | 0.5 | 0.6 |
| Zinc stearate | — | — | 1.2 |
| MAGUNESIUM OXIDE (made by Kamishima Kagaku Kogyo Co., Ltd.) | 1.0 | 1.0 | — |
| Accelerator DM (ACCEL DM, made by Kawaguchi Kagaku Kogyo Co., Ltd.) | 1.0 | 1.0 | — |
| Cumarone indene resin (Cumarone NG, made by Mitsubishi Chemical Corp.) | 10.0 | 10.0 | — |
| Zinc white | 0.5 | 0.5 | 0.3 |
| Accelerator M (NOCCELER M, made by Ohuchi Shinko Kagaku Co., Ltd.) | — | — | — |
| Accelerator TT (NOCCELER TT, made by Ohuchi Shinko Kagaku Co., Ltd.) | — | — | — |
| Accelerator DPG (NOCCELER D, D-T, made by Ohuchi Shinko Kagaku Co., Ltd.) | 0.1 | 0.1 | — |
| Powdery sulfur | 1.0 | 1.0 | — |
| Method of charging crosslinking agent | Rubber kneading | Rubber kneading | Rubber kneading |
| Gelation ratio (%) | — | — | 83 |
| Gas permeability constant ($10^{-12}$ cc.cm/cm$^2$.s.cmHg) | 300 | 200 | 11 |

Measurement of gas permeability constant: according to JIS K7126(1987)(Test method (A method) for gas permeability of plastic film and sheet) by Model MT-C3, made by Toyo Seiki Seisakusho Co., Ltd.

Although the above examples show the application to the tire having a structure shown in FIG. 1, similar effects are obtained even when the invention is applied to a tire having a sidewall reinforcing layer as shown in FIG. 2.

EXAMPLES 107–115

Comparative Examples 71–72

Tires for passenger cars having a tire size of 185/70R14 are prepared by applying one of the composite bodies of various specifications shown in Tables 41 and 42 to a tire having a structure shown in FIG. 1 or 2. In this case, the tire 1 is made according to a general structure in the respective tire kind and size. Moreover, contents of foaming compositions and foaming agents in Tables 41 and 42 are shown in Table 43, and rubber kind of an innerliner layer is shown in Table 44, respectively.

With respect to the composite body filled tires, a running history is given to each tire by running on a drum at room temperature of 38° C. over 5000 km under a load of 4.17 kN. In this case, a tire temperature during the running on the drum is measured by means of a non-contact thermometer, and a heat generation property of each tire is compared by comparing temperature values arriving at equilibrium state. Moreover, the comparison is made as Comparative Example 70 is set to a control. This is applied also in the following evaluations.

And also, the gripping property of the tire on snow or ice road is evaluated by mounting the tire onto a passenger car of 2000 cc and measuring a braking distance from a speed of 20 km/h on ice and snow roads of a test course. An index is represented by a reciprocal of the distance, wherein the larger the index value, the better the property.

Further, the tire-rim assembly after the running on the drum is mounted onto a passenger car of 2000 cc, and subjected to an external injury by passing a nail of 3 mm in diameter and 3 cm in length from an outside of a tire tread through a tread and then run on a test circuit course at 90 km/h under a load corresponding to a total weight of four crewmen over 300 km at maximum, during which a runnable distance of not less than 200 km is acceptable as a judgment standard.

These measured results are also shown in Tables 41 and 42.

TABLE 41

| | Comparative Example 71 | Example 107 | Example 108 | Example 109 | Example 110 | Comparative Example 72 | Example 111 |
|---|---|---|---|---|---|---|---|
| Kind of resin or composition constituting continuous phase of composite body and use volume (1) of resin or composition constituting continuous phase of composite body | No. 1: 0.95 | No. 1: 0.95 No. 3: 0.25 | No. 1: 0.71 No. 4: 0.25 | No. 1: 0.95 No. 3: 0.25 No. 4: 0.25 | No. 2: 1.31 No. 3: 0.25 No. 4: 0.25 | No. 2: 1.80 | No. 6: 0.70 No. 5: 0.25 No. 4: 0.25 |
| Form of cell | closed cell | closed cell | closed cell | closed cell | closed cell | closed cell | closed cell |
| Ingredient in cell | propane | propane normal butane | propane cyclopropane | propane normal butane cyclopropane | nitrogen normal butane cyclopropane | nitrogen | 2H-heptafluoro-propane neopentane cyclopropane |
| Cell content calculated (vol %) (inner volume of tire is 24 liters) | 96.04 | 95.00 | 96.00 | 95.00 | 92.45 | 92.50 | 95.00 |
| Kind of innerliner rubber | A1 | A1 | A1 | A1 | A1 | A1 | A1 |
| Pressure in cell (kPa) | 300 | 300 | 300 | 300 | 300 | 300 | 300 |
| Tire temperature during the running on drum (° C.) | 82 | 63 | 80 | 64 | 64 | 84 | 66 |
| Runnable distance when the tire after the running on drum over 5000 km is subjected to external injury (km) | 300 | 300 | 300 | 300 | 300 | 300 | 300 |
| Braking distance on ice road (−10° C.) (index) | 100 | 100 | 110 | 109 | 110 | 100 | 112 |
| Braking distance on snow road (−10° C.) (index) | 100 | 100 | 118 | 116 | 117 | 99 | 121 |

TABLE 42

| | Example 112 | Example 113 | Example 114 | Example 115 |
|---|---|---|---|---|
| Kind of resin or composition constituting continuous phase of composite body and use volume (1) of resin or composition constituting continuous phase of composite body | No. 7: 1.20 | No. 8: 0.96 | No. 9: 1.20 | No. 10: 1.20 |
| Form of cell | closed cell | closed cell | closed cell | closed cell |
| Ingredient in cell | propane normal butane | propane cyclopropane | propane normal butane cyclopropane | nitrogen normal butane cyclopropane |
| Cell content calculated (vol %) (inner volume of tire is 24 liters) | 95.00 | 95.00 | 95.00 | 95.00 |
| Kind of innerliner rubber | B1 | B1 | B1 | B1 |
| Pressure in cell (kPa) | 300 | 300 | 300 | 300 |
| Tire temperature during the running on drum (° C.) | 62 | 82 | 62 | 65 |

TABLE 42-continued

|  | Example 112 | Example 113 | Example 114 | Example 115 |
|---|---|---|---|---|
| Runnable distance when the tire after the running on drum over 5000 km is subjected to external injury (km) | 300 | 300 | 300 | 300 |
| Braking distance on ice road (−10° C.) (index) | 100 | 109 | 111 | 113 |
| Braking distance on snow road (−10° C.) (index) | 100 | 120 | 115 | 119 |

TABLE 43

| No. | Polymer as continous phase | Foaming agent *4 | Content of foaming agent | Gas ingredient in cell | Remarks |
|---|---|---|---|---|---|
| 1 | acrylonitrile/methacrylonitrile copolymer | propane | 20 mass % | propane | *1 |
| 2 | acrylonitrile/methacrylonitrile copolymer | ADDA (azodicarbonamide) | 20 mass % | $N_2$ gas |  |
| 3 | acrylonitrile/methyl methacrylate copolymer | normal butane | 20 mass % | normal butane | *2 |
| 4 | vinylidene chloride/acrylonitrile/methyl methacrylate terpolymer | cyclopropane | 20 mass % | cyclopropane | *3 |
| 5 | vinylidene chloride/acrylonitrile/methyl methacrylate terpolymer | neopentane | 20 mass % | neopentane | *2 |
| 6 | acrylonitrile/methacrylonitrile/methyl methacrylate terpolymer | 2H-heptafuluoropropane | 20 mass % | 2H-heptafluoropropane | *3 |
| 7 | acrylonitrile/methacrylonitrile copolymer | propane (79%) normal butane (21%) | 20 mass % | propane normal butane | *2 |
| 8 | acrylonitrile/methyl methacrylate copolymer | propane (74%) cyclopropane (26%) | 20 mass % | propane cyclopropane | *3 |
| 9 | acrylonitrile/methacrylonitrile/methyl methacrylate terpolymer | propane (58%) normal butane (21%) cyclopropane (21%) | 20 mass % | propane normal butane cyclopropane | *2 *3 |
| 10 | vinylidene chloride/acrylonitrile/methyl methacrylate terpolymer | 2H-heptafuluoropropane (58%) neopentane (21%) cyclopropane (21%) | 20 mass % | 2H-heptafluoropropane neopentane cyclopropane | *2 *3 |

*1: use of conventional expanding gas
*2: control rise of tire temperature by vaporizing above 40° C. under 300 kPa
*3: improve performances on snow and ice by liquefying below 0° C. under 300 kPa to reduce internal pressure of tire at a lower temperature
*4: value in parenthesis is ratio of each ingredient in foaming agent

TABLE 44

|  | A1 | B1 |
|---|---|---|
| Nylon-11 (Rilsan BMNO, trade name, made by Ato-Chem Co., Ltd.) | — | 8 |
| Nylon-6/66 copolymer ① [Aramine CM6001, trade name, (made by Toray Industries, Inc.)] | — | 32 |
| Nylon-6/66 copolymer ② [Aramine CM6041, trade name, (made by Toray Industries, Inc.)] | — | — |
| Br-IPMS [EXXPR089-4, trade name, (made by Exxon Chemical Corp.)] | — | 60 |
| HNBR (Zetpo1 1020, trade name, (made by Nippon Zeon Co., Ltd.)] | — | — |
| ENR [50% Epoxidized Natural Rubber (made in Malaysia)] | — | — |
| NR | — | — |
| BR | — | — |
| Butyl rubber (JSR BUTYL 065) | 100 | — |
| Carbon black (Seast V, made by Tokai Carbon Co., Ltd.) | 70 | — |
| Spindle oil | 11 | — |
| Stearic acid | 0.5 | 0.6 |
| Zinc stearate | — | 1.2 |
| MAGUNESIUM OXIDE (made by Kamishima Kagaku Kogyo Co., Ltd.) | 1.0 | — |
| Accelerator DM (ACCEL DM, made by Kawaguchi Kagaku Kogyo Co., Ltd.) | 1.0 | — |
| Cumarone indene resin (Cumarone NG, made by Mitsubishi Chemical Corp.) | 10.0 | — |
| Zinc white | 0.5 | 0.3 |
| Accelerator M (NOCCELER M, made by Ohuchi Shinko Kagaku Co., Ltd.) | — | — |
| Accelerator TT (NOCCELER TT, made by Ohuchi Shinko Kagaku Co., Ltd.) | — | — |
| Accelerator DPG (NOCCELER D, D-T, made by Ohuchi Shinko Kagaku Co., Ltd.) | 0.1 | — |
| Vulcanized accelerator (NOCCELER NS-F, made by Ohuchi Shinko Kagaku Co., Ltd.) | — | — |
| Powdery sulfur | 1.0 | — |
| Method of charging crosslinking agent | rubber kneading | biaxial kneading |
| Gelation ratio (%) | — | 83 |
| Gas permeability constant ($10^{-12}$ cc.cm/cm$^2$.s.cmHg) | 200 | 11 |

Measurement of gas permeability constant: according to JIS K7126(1987) (Test method (A method) for gas permeability of plastic film and sheet) by Model MT-C3, made by Toyo Seiki Seisakusho Co., Ltd.

EXAMPLES 116–121

Comparative Examples 73–76

Immediately after a tire for passenger car having a tire size of 185/70R14 is built through vulcanization, the tire is assembled onto a rim having a size of 5.5J×14 and each of various foaming compositions shown in Table 45 is filled in an inside of the tire-rim assembly while rotating the tire and expanded to prepare a passenger car tire shown in FIG. 1 or 2. Moreover, conditions of building through vulcanization, filling and expansion are shown in Tables 46 and 47.

An accuracy of a composite body filled tire in the above production step is measured by using a tire balancer, and superiority or inferiority of which is evaluated by a weight of a balance-weight attached to a rim flange. The lighter the weight of the balance-weight, the better the accuracy.

And also, the tire provided in its inside with the composite body is mounted onto a front wheel shaft of a passenger car of 2000 cc without attaching any balance-weight and run on a house test course at 100 km/h to evaluate vibration level. The evaluation is based on a five-point process, wherein the larger the numerical value, the better the result.

Then, the tire is run on a drum at a speed of 89 km/h and room temperature of 38° C. under a load of 4.58 kN over 5000 km to give a running history and thereafter mounted onto a passenger car of 2000 cc, and subjected to an external injury by passing a nail of 3 mm in diameter and 3 cm in length from an outside of a tire tread through a tread and then run on a test circuit course at 90 km/h under a load corresponding to a total weight of four crewmen over 300 km at maximum, during which a runnable distance of not less than 200 km is determined to be acceptable as a judgment standard.

These measured results are also shown in Tables 46 and 47.

TABLE 45

| No. | Continuous phase of foaming composition | Kind of foaming agent (assistant) | Content of foaming agent (wt %) | Expansion starting temperature (° C.) | Gas ingredient in cell |
|---|---|---|---|---|---|
| 1 | acrylonitnie/methacrylonitrile copolymer | propane | 20 | 110 | propane |
| 2 | acrylonitrile/methacrylonitrile copolymer | ADCA (urea) | 20 (2) | 150 | nitrogen |
| 3 | vinylidne chloride/acrylontrile copoyelmer | 2H-heptafluoro-propane | 20 | 100 | 2H-heptafluoro-propane |
| 4 | acrylonitrile/methacrylonitrile/methyl methacrylate terpolymer | cyclopropane | 20 | 120 | cyclopropane |

TABLE 46

| | Comparative Example 73 | Comparative Example 74 | Comparative Example 75 | Example 116 | Example 117 |
|---|---|---|---|---|---|
| Kind and volume (1) of foaming composition | No. 1: 0.96 | No. 1: 0.96 | No. 2: 1.80 | No. 3: 0.96 | No. 4: 0.96 |
| Form of cell | closed cell | closed cell | closed cell | closed cell | closed cell |
| Ingredient in cell | propane | propane | nitrogen | 2H-heptafluoro-propane | cyclo-propane |
| Cell content calculated (vol %) (inner volume of tire is 24 liters) | 96.0 | 96.0 | 92.5 | 96.0 | 96.0 |
| Pressure in cell (kPa) | 300 | 300 | 300 | 300 | 300 |
| Expansion starting temperature of foaming composition (° C.) | 110 | 110 | 150 | 100 | 120 |
| Temperature in filling of foaming composition (° C.) | 25 | 150 | 165 | 120 | 135 |
| Heating temperature after the filling of foaming composition (° C.) | 140 (heating) | 140 | 140 | 140 | 140 |
| Rotating speed of tire in filling-expansion of foaming composition (rpm) | 0 | 0 | 0 | 10 | 20 |
| Replacement of tire in filling-expansion of foaming composition (*) | horizontal | horizontal | horizontal | vertical | vertical |
| Balance weight value of tire-rim assembly filled, right (g) | 140 | 125 | 115 | 65 | 35 |
| Balance weight value of tire-rim assembly filled, left (g) | 110 | 110 | 95 | 65 | 35 |
| Ride comfort in actual running test | 2.0 | 2.5 | 2.5 | 4.0 | 4.5 |
| Runnable distance of tire after being subjected to external injury (km) | complete run of 300 km | complete run of 300 km | complete run of 300 km | complete run of 300 km | complete run of 300 km |

(*) horizontal: rotation in a plane perpendicular to vertical direction vertical: rotation in a plane parallel to vertical direction

TABLE 47

| | Comparative Example 76 | Example 118 | Example 119 | Example 120 | Example 121 |
|---|---|---|---|---|---|
| Kind and volume (1) of foaming composition | No. 1: 0.96 | No. 1: 0.96 | No. 2: 1.80 | No. 3: 0.96 | No. 1: 0.96 |
| Form of cell | closed cell | closed cell | closed cell | closed cell | closed cell |
| Ingredient in cell | propane | propane | nitrogen | 2H-heptafluoro-propane | cyclo-propane |
| Cell content calculated (vol %) (inner volume of tire is 24 liters) | 96.0 | 96.0 | 92.5 | 96.0 | 96.0 |
| Pressure in cell (kPa) | 300 | 300 | 300 | 300 | 300 |
| Expansion starting temperature of foaming composition (° C.) | 110 | 110 | 150 | 100 | 110 |
| Temperature in filling of foaming composition (° C.) | 25 | 150 | 165 | 120 | 25 |

TABLE 47-continued

|  | Comparative Example 76 | Example 118 | Example 119 | Example 120 | Example 121 |
|---|---|---|---|---|---|
| Heating temperature after the filling of foaming composition (° C.) | 140 | 140 | 140 | 140 | 140 |
| Rotating speed of tire in filling-expansion of foaming composition (rpm) | 0 | 20 | 60 | 60 | 20 |
| Replacement of tire in filling-expansion of foaming composition (*) | vertical | horizontal | horizontal | vertical | vertical |
| Balance weight value of tire-rim assembly filled, right (g) | 180 | 70 | 55 | 15 | 35 |
| Balance weight value of tire-rim assembly filled, left (g) | 185 | 60 | 50 | 15 | 35 |
| Ride comfort in actual running test | 1.0 | 4.0 | 4.0 | 5.0 | 4.5 |
| Runnable distance of tire after being subjected to external injury (km) | complete run of 300 km | complete run of 300 km | complete run of 300 km | complete run of 300 km | complete run of 300 km |

(*) horizontal: rotation in a plane perpendicular to vertical direction vertical: rotation in a plane parallel to vertical direction

EXAMPLES 122–126

Comparative Examples 77–81

Tires for passenger cars having a tire size of 185/70R14 are prepared by applying one of the composite bodies of various specifications shown in Table 48 to a tire having a structure shown in FIGS. 1 or 2 and assembling it onto a rim having a size of 5.5J×14. In this case, the tire 1 is made according to a general structure in the respective tire kind and size. Moreover, contents of foaming compositions and foaming agents in Table 48 are shown in Table 49, and rubber kind of an innerliner layer is shown in Table 50, respectively.

After each of the thus obtained tires is run on a drum under a load of 4.18 kN over 5000 km, the tire is mounted onto a passenger car of 2000 cc, and subjected to an external injury by passing a nail of 3 mm in diameter and 3 cm in length from an outside of a tire tread through a tread and then run on a test circuit course at 90 km/h under a load corresponding to a total weight of four crewmen over 500 km at maximum. The runnable distance is represented by an index on the basis that each comparative example corresponding to the respective example is set to 100, wherein the larger the index value, the better the result.

And also, a tire temperature is measured immediately after the completion of the above test.

These measured results are also shown in Table 48.

TABLE 48

|  | Comparative Example 77 | Example 122 | Comparative Example 78 | Example 123 | Comparative Example 79 | Example 124 | Comparative Example 80 | Example 125 | Comparative Example 81 | Example 126 |
|---|---|---|---|---|---|---|---|---|---|---|
| No. of foaming composition | A1 | A1 B1 | A2 | A2 B2 | A3 | A3 B1 | A4 | A4 B2 | A5 | B2 |
| Expansion starting temperature of foaming composition (° C.) | A1: 105 | A1: 105 B1: 120 | A2: 92 | A2: 92 B2: 144 | A3: 94 | A3: 94 B1: 120 | A4: 96 | A4: 96 B2: 144 | A5: 105 | A5: 105 B2: 144 |
| Volume (1) of foaming composition | A1: 0.96 | A1: 0.96 B1: 0.1 | A2: 1.6 | A2: 1.6 B2: 0.1 | A3: 0.69 | A3: 0.69 B1: 0.2 | A4: 1.2 | A4: 1.2 B2: 0.1 | A5: 0.96 | A1: 0.96 A1: 0.5 |
| Form of cell | closed cell | closed cell | closed cell | closed cell | closed cell | closed cell | closed cell | closed cell | closed cell | closed cell |
| <Breakdown of heat decomposable foaming agent added> Kind of foaming agent added | TSH | TSH | ADCA | ADCA | — | — | — | — | TSH | TSH |
| Amount of foaming added (g) | 600 | 600 | 360 | 360 | — | — | — | — | 600 | 600 |
| Kind of foaming assistant added | — | — | urea | urea | — | — | — | — | — | — |
| Amount of foaming assistant added (g) | — | — | 110 | 110 | — | — | — | — | — | — |
| Kind and amount (1) of foaming composition added | — | — | — | — | — | — | — | — | — | — |
| Cell content calculated (vol %) (inner volume of tire is 24 liters) | 96.00 | 95.58 | 93.33 | 92.92 | 97.13 | 96.29 | 95.00 | 94.58 | 96.00 | 93.92 |
| Kind of innerliner rubber | composition -1 | composition -1 | composition -1 | composition -1 | composition -1 | composition -1 | composition -2 | composition -2 | composition -2 | composition -2 |
| Pressure in cell (kPa) | 300 | 300 | 300 | 300 | 300 | 300 | 300 | 300 | 300 | 300 |
| <Test for run-flat durability> Index of runnable distance on drum when tire after the running on drum over 5000 km is subjected to external injury | 100 | 121 | 100 | 118 | 100 | 128 | 100 | 121 | 100 | 140 |

TABLE 48-continued

| | Comparative Example 77 | Example 122 | Comparative Example 78 | Example 123 | Comparative Example 79 | Example 124 | Comparative Example 80 | Example 125 | Comparative Example 81 | Example 126 |
|---|---|---|---|---|---|---|---|---|---|---|
| Tire temperature (° C.) just after the completion of test for run-flat durability | 156 | 155 | 161 | 158 | 153 | 151 | 161 | 159 | 158 | 155 |

*Foaming agent ADCA: Vinyhole AC#3 made by Eiwa Kasei Kogyo Co., Ltd.
TSH: Unihole H made by Eiwa Kasei Kogyo Co., Ltd.

TABLE 49

| Foaming composition No. | Continuous phase of foaming composition | Trade name | Expansion starting temperature (° C.)* | Expansion means** | Kind of main gas | Content of gas ingredient |
|---|---|---|---|---|---|---|
| A1 | PE/PS copolymer | trial piece | 105° C. | Addition of TSH (paratoluenesulfonyl hydrazine) | nitrogen | — |
| A2 | nylon-6/12 copolymer | Ubenylon 5033J-12 | 92° C. | Addition of ADCA (azodicarbonamide) and urea | nitrogen | — |
| A3 | MMA/AN/MAN | trial piece | 94° C. | Hollow resin particles sealed with liquefied gas | propane | 10% |
| A4 | PVDC/MMA/AN/MAN | trial piece | 96° C. | Hollow resin particles sealed with liquefied gas | propane | 10% |
| A5 | AN/ST copolymer | trial piece | 105° C. | Addition of TSH (paratoluenesulfonyl hydrazine) | nitrogen | — |
| B1 | MMA/AN/MAN | Expancel 091-DU | 120° C. | Hollow resin particles sealed with liquefied gas | isopentane | 10% |
| B2 | AN/MAN | trial piece | 144° C. | Hollow resin particles sealed with liquefied gas | neopentane | 10% |

*Measurement of expansion starting temperature
Instrument: Nishizawa PERKIN-ELMER 7 Series Thermal Analysis Systems
Conditions: temperature rising rate 10° C./min, measurement starting temperature 25° C., measurement finishing temperature 200° C.
Physical quantity measured: measure expansion displacement quantity through expansion, temperature in rising of displacement quantity is expansion starting temperature.
**Contents of heat decomposable foaming agent and foaming assistant added
Foaming agent ADCA: Vinyhole AC#3 made by Eiwa Kasei Kogyo Co., Ltd.
Foaming agent TSH: Unihole H made by Eiwa Kasei Kogyo Co., Ltd.
Expanding assistant urea: Cellpaste 101, made by Eiwa Kasei Kogyo Co., Ltd.

TABLE 50

| Kind of innerliner rubber composition | Composition 1 | Composition 2 |
|---|---|---|
| Nylon-11 (Rilsan BMN, trade name, made by Ato-Chem Co., Ltd.) | — | 8 |
| Nylon-6/66 copolymer ① [Aramine CM6001, trade name, (made by Toray Industries, Inc.)] | — | 32 |
| Nylon-6/66 copolymer ② [Aramine CM6041, trade name, (made by Toray Industries, Inc.)] | — | — |
| Br-IPMS [EXXPR089-4, trade name, (made by Exxon Chemical Corp.)] | — | 60 |
| HNBR(Zetpol 1020, trade name, (made by Nippon Zeon Co., Ltd.)] | — | — |
| ENR [50% Epoxidized Natural Rubber (made in Malaysia)] | — | — |
| NR | — | — |
| BR | — | — |
| Butyl rubber (JIS BUTYL 065) | 100 | — |
| Carbon black (Seast V, made by Tokai Carbon Co., Ltd.) | 70 | — |
| Stearic acid | 0.5 | 0.6 |
| Zinc stearate | — | 1.2 |
| MAGUNESIUM OXIDE (made by Kamishima Kagaku Kogyo Co., Ltd.) | 1.0 | — |
| Accelerator DM (ACCEL DM, made by Kawaguchi Kagaku Kogyo Co., Ltd.) | 1.0 | — |
| Cumarone indene resin (Cumarone NG, made by Mitsubishi Chemical Corp.) | 10.0 | — |
| Zinc white | 0.5 | 0.3 |
| Accelerator M (NOCCELER M, made by Ohuchi Shmko Kagaku Co., Ltd.) | — | — |
| Accelerator TT (NOCCELER TT, made by Ohuchi Shinko Kagaku Co., Ltd.) | — | — |
| Accelerator DPG (NOCCELER D, D-T, made by Ohuchi Shinko Kagaku Co., Ltd.) | 0.1 | — |
| Vulcanized accelerator (NOCCELER NS-F, made by Ohuchi Shinko Kagaku Co., Ltd.) | — | — |
| Powdery sulfur | 1.0 | — |
| Method of charging crosslinking agent | rubber kneading | rubber kneading |
| Gelation ratio (%) | — | 83 |
| Gas permeability constant ($10^{-12}$ cc · cm/cm$^2$ · s · cmHg) | 200 | 11 |

Measurement of gas permeability constant: according to JIS K7126(1987) (Test method (A method) for gas permeability of plastic film and sheet) by Model MT-C3, made by Toyo Seiki Seisakusho Co., Ltd.

EXAMPLES 127–134

Comparative Examples 82–85

Tires for passenger cars having a tire size of 185/70R14 are prepared by applying one of the composite bodies of various specifications shown in Tables 51 and 52 to a tire having a structure shown in FIG. 1 and assembling onto a rim having a size of 5.5J×14. In this case, the tire 1 is made according to a general structure in the respective tire kind and size. Moreover, kinds of foaming compositions in Tables 51 and 52 are shown in Table 53.

The thus obtained tire is mounted onto a front wheel shaft of a passenger car of 2000 cc and run on a test course at 100 km/h to evaluate vibration level. The evaluation is based on a ten-point process and represented by an average of evaluation points by two professional drivers, wherein the larger the numerical value, the better the result.

Then, the tire is run on a drum under a load of 4.18 kN over 5000 km to give a running history and thereafter mounted onto a passenger car of 2000 cc, and subjected to an external injury by passing a nail of 3 mm in diameter and 3 cm in length from an outside of a tire tread through a tread and then run on a test circuit course at 90 km/h under a load corresponding to a total weight of four crewmen to measure a runnable distance. The distance is represented by an index on the basis that a corresponding comparative example is set to 100, wherein the larger the index value, the better the result.

And also, a rolling resistance is measured with respect to the tire after the running on the drum. The rolling resistance is measured by an inertia running method, in which a teat is carried out under conditions that a load is JIS 100% load and a speed of starting inertia running is 100 km/h and a work quantity corresponding to the rolling resistance of the tire is measured from a curve of decreasing speed of inertia running drum, and represented by an index on the basis that a corresponding comparative example is set to 100 wherein the smaller the index value, the lower the rolling resistance.

These measured results are also shown in Tables 51 and 52.

TABLE 51

| | Comparative Example 82 | Example 127 | Comparative Example 83 | Example 128 | Comparative Example 84 | Example 129 | Comparative Example 85 | Example 130 |
|---|---|---|---|---|---|---|---|---|
| No. of foaming composition | A1 | B1 | A2 | B2 | A3 | B3 | A4 | B4 |
| Average content of gas ingredient in foaming composition (%) | 8 | 13 | 9 | 45 | 6 | 40 | 5 | 25 |
| Volume (1) of foaming composition | 1.88 | 1.15 | 1.67 | 0.33 | 2.46 | 0.38 | 3.0 | 0.6 |
| Form of cell | closed cell | closed cell | closed cell | closed cell | closed cell | closed cell | closed cell | closed cell |
| Cell content calculated (vol %) (inner volume of tire is 24 liters) | 92.17 | 95.21 | 93.04 | 98.63 | 89.75 | 98.42 | 87.5 | 97.5 |
| Pressure in cell (kPa) | 250 | 250 | 250 | 250 | 250 | 250 | 250 | 250 |
| <Test for run-flat durability> Index of runnable distance on drum when tire after the running on drum over 5000 km is subjected to external injury | 100 | 101 | 100 | 100 | 100 | 100 | 100 | 101 |
| <Rolling resistance> Index of rolling resistance using tire after the running on drum over 5000 km | 100 | 97 | 100 | 94.5 | 100 | 94.5 | 100 | 96.5 |
| <Ride comfort> Evaluation point of ride comfort using tire after the running on drum over 5000 km | 4.5 | 5.5 | 4.5+ | 6.5+ | 4.5 | 6.5+ | 4.5 | 6.0+ |

TABLE 52

| | Comparative Example 82 | Example 131 | Comparative Example 83 | Example 132 | Comparative Example 84 | Example 133 | Comparative Example 85 | Example 134 |
|---|---|---|---|---|---|---|---|---|
| No. of foaming composition | A1 | A1 B1 | A2 | A2 B2 | A3 | A3 B2 | A4 | A4 B3 |
| Average content of gas ingredient in foaming composition (%) | 8 | 10.4 | 9 | 15.1 | 6 | 17.1 | 5 | 10.6 |
| Volume (1) of foaming composition | 1.88 | A1: 0.75 B1: 0.69 | 1.67 | A1: 0.84 B2: 0.17 | 2.46 | A3: 0.49 B2: 0.26 | 3.0 | A4: 0.75 B3: 0.29 |
| Cell content calculated (vol %) (inner volume of tire is 24 liters) | 92.17 | 94.00 | 93.04 | 95.79 | 89.75 | 96.88 | 87.50 | 95.67 |
| Pressure in cell (kPa) | 250 | 250 | 250 | 250 | 250 | 250 | 250 | 250 |
| <Test for run-flat durability> Index of runnable distance on drum when tire after the running on drum over 5000 km is subjected to external injury | 100 | 100 | 100 | 100 | 100 | 100 | 100 | 101 |
| <Rolling resistance> Index of rolling resistance using tire after the running on drum over 5000 km | 100 | 98 | 100 | 97 | 100 | 96.5 | 100 | 97 |

TABLE 52-continued

|  | Comparative Example 82 | Example 131 | Comparative Example 83 | Example 132 | Comparative Example 84 | Example 133 | Comparative Example 85 | Example 134 |
|---|---|---|---|---|---|---|---|---|
| <Ride comfort> Evaluation point of ride comfort using tire after the running on drum over 5000 km | 4.5 | 5.0+ | 4.5+ | 5.5 | 4.5 | 5.5+ | 4.5 | 5.5 |

TABLE 53

| Foaming composition No. | Continuous phase of foaming composition | Trade name | Expansion means | Kind of main gas | Content of gas ingredient |
|---|---|---|---|---|---|
| A1 | AN/MAN | trial piece | Hollow resin particles sealed with liquefied gas | propane | 8% |
| A2 | MMA/AN/MAN | trial piece | Hollow resin particles sealed with liquefied gas | 2H-heptafluoro-propane | 9% |
| A3 | PVDC/MMA/AN | trial piece | Hollow resin particles sealed with liquefied gas | cyclopropane | 6% |
| A4 | PVDC/MMa/AN/MAN | trial piece | Hollow resin particles sealed with liquefied gas | isobutane | 5% |
| B1 | AN/MAN | trial piece | Hollow resin particles sealed with liquefied gas | propane | 13% |
| B2 | MMA/AN/MAN | trial piece | Hollow resin particles sealed with liquefied gas | 2H-heptafluoro-propane | 45% |
| B3 | PVDC/MMa/AN | trial piece | Hollow resin particles sealed with liquefied gas | cyclopropane | 40% |
| B4 | PVDC/MMa/AN/MAN | trial piece | Hollow resin particles sealed with liquefied gas | isobutane | 25% |

Although the above examples show the application to the tire having a structure shown in FIG. 1, similar effects are obtained even when the invention is applied to a tire having a sidewall reinforcing layer as shown in FIG. 2.

According to the invention, there can be provided tires capable of stably running even if the tire is subjected to an external injury without sacrificing rolling resistance and ride comfort in the usual running before being subjected to the external injury.

What is claimed is:

1. A tire comprising:
a plurality of foamed hollow polymer particles arranged in an inside of a hollow doughnut-shaped tire, said foamed hollow polymer particles forming a composite body consisting of a continuous phase made of a polymeric material formed by shell portions of the foamed hollow polymer particles, and a gas encapsulated in a substantially spherically shaped closed cell thereof,
wherein the composite body has a cell content of 80.00 vol % to 98.75 vol %, and an internal pressure at 25° C. in the closed cells of the composite body is not less than 150 kPa as an absolute pressure,
wherein the continuous phase of the composite body is made of a resin having a polar functional group in their molecule and
wherein the resin having a polar functional group in their molecule is at least one of a polyvinyl alcohol resin, an acrylonitrile copolymer, a vinylidene chloride copolymer, an acrylonitrile/styrene resin, a polyester resin and a nylon resin.

2. A tire comprising:
a plurality of foamed hollow polymer particles arranged in an inside of a hollow doughnut-shaped tire, said foamed hollow polymer particles forming a composite body consisting of a continuous phase made of a polymeric material formed by shell portions of the foamed hollow polymer particles, and a gas encapsulated in a substantially spherically shaped closed cell thereof,
wherein the composite body has a cell content of 80.00 vol % to 98.75 vol %, and an internal pressure at 25° C. in the closed cells of the composite body is not less than 150 kPa as an absolute pressure,
wherein the continuous phase of the composite body is made of an acrylonitrile polymer, and the acrylonitrile polymer is at least one selected from acrylonitrile polymer, acrylonitrile/methacrylonitrile copolymer, acrylonitrile/methyl methacrylate copolymer and acrylonitrile/methacrylonitrile/methyl methacrylate terpolymer and has a glass transition point of not lower than 80° C.

* * * * *